(12) United States Patent  
Zhang et al.

(10) Patent No.: US 12,500,652 B2  
(45) Date of Patent: Dec. 16, 2025

(54) COMMUNICATION METHOD AND APPARATUS

(71) Applicant: Huawei Technologies Co., Ltd., Shenzhen (CN)

(72) Inventors: Di Zhang, Shenzhen (CN); Kunpeng Liu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 688 days.

(21) Appl. No.: 17/486,621

(22) Filed: Sep. 27, 2021

(65) Prior Publication Data

US 2022/0015085 A1 Jan. 13, 2022

Related U.S. Application Data

(63) Continuation of application No. PCT/CN2020/079607, filed on Mar. 17, 2020.

(30) Foreign Application Priority Data

Mar. 28, 2019 (CN) .......................... 201910245843.0  
Aug. 16, 2019 (CN) .......................... 201910760399.6

(51) Int. Cl.  
*H04L 5/00* (2006.01)  
*H04B 7/06* (2006.01)  
(Continued)

(52) U.S. Cl.  
CPC ...... *H04B 7/06968* (2023.05); *H04W 72/046* (2013.01)

(58) Field of Classification Search  
CPC ......... H04W 72/1263; H04W 72/0446; H04W 72/0453; H04W 72/04; H04L 1/1861; H04L 1/1893; H04B 7/0697  
(Continued)

(56) References Cited

U.S. PATENT DOCUMENTS

2008/0165883 A1* 7/2008 Jiang .................... H04L 5/0044  
375/267  
2010/0195614 A1 8/2010 Nimbalker et al.  
(Continued)

FOREIGN PATENT DOCUMENTS

CN 102237987 A 11/2011  
CN 107770869 A 3/2018  
(Continued)

OTHER PUBLICATIONS

InterDigital Inc., "Logical Channel Selection Restrictions in LCP," 3GPP TSG-RAN WG2 NR AH#2, Qingdao, P.R. China, R2-1706681, Total 4 pages, 3rd Generation Partnership Project, Valbonne, France (Jun. 27-29, 2017).

(Continued)

*Primary Examiner* — Marcus Smith  
*Assistant Examiner* — Jason A Harley  
(74) *Attorney, Agent, or Firm* — Leydig, Voit & Mayer, Ltd.

(57) ABSTRACT

This application discloses a communication method and an apparatus, and relates to the communication field, so that a network device and a terminal device determine a mapping relationship between spatial correlation parameters and transport blocks when the transport blocks are repeatedly sent. The communication method includes: receiving first indication information, where the first indication information is used to indicate K spatial correlation parameters for receiving a transport block carried on N resources, K and N are integers greater than 1, and K≤N; determining a mapping relationship between the K spatial correlation parameters and the N resources; and receiving the transport block on the N resources based on the mapping relationship.

11 Claims, 12 Drawing Sheets

(51) Int. Cl.
  *H04J 11/00* (2006.01)
  *H04W 56/00* (2009.01)
  *H04W 72/04* (2023.01)
  *H04W 72/044* (2023.01)
  *H04W 72/0446* (2023.01)
  *H04W 72/23* (2023.01)
  *H04W 72/542* (2023.01)

(58) Field of Classification Search
  USPC .......................................................... 370/330
  See application file for complete search history.

(56) References Cited

U.S. PATENT DOCUMENTS

| | | | | |
|---|---|---|---|---|
| 2013/0097470 | A1* | 4/2013 | Hwang | H03M 13/35 714/E11.032 |
| 2015/0373673 | A1* | 12/2015 | Lyu | H04L 27/2666 370/329 |
| 2019/0059020 | A1* | 2/2019 | Ge | H04L 1/0007 |
| 2020/0052853 | A1* | 2/2020 | Qin | H04L 5/0094 |
| 2020/0136770 | A1* | 4/2020 | Khoshnevisan | H04L 1/08 |
| 2020/0220676 | A1* | 7/2020 | Xu | H04B 7/06 |
| 2020/0374045 | A1* | 11/2020 | Yin | H04B 7/0456 |
| 2021/0273758 | A1* | 9/2021 | Liu | H04L 5/005 |
| 2021/0352665 | A1* | 11/2021 | Kang | H04L 1/08 |
| 2021/0352706 | A1* | 11/2021 | Kang | H04L 1/1819 |
| 2022/0174696 | A1* | 6/2022 | Kim | H04L 5/001 |
| 2022/0330285 | A1* | 10/2022 | Zhou | H04W 72/1263 |

FOREIGN PATENT DOCUMENTS

| | | |
|---|---|---|
| CN | 108123778 A | 6/2018 |
| CN | 108235433 A | 6/2018 |
| CN | 108631972 A | 10/2018 |
| CN | 108631998 A | 10/2018 |
| CN | 109474403 A | 3/2019 |
| WO | 2019004756 A1 | 1/2019 |

OTHER PUBLICATIONS

NTT DOCOMO, INC., "Enhancements on multi-TRP/panel transmission," 3GPP Draft, 3GPP TSG RAN WG1 #96, Athens, Greece, R1-1902812, XP051600507, Feb. 16, 2019, total 25 pages, 3rd Generation Partnership Project, Valbonne, France (Feb. 25-Mar. 1, 2019).

Huawei, HiSilicon, "Enhancements on multi-TRP/panel transmission," 3GPP DRAFT, 3GPP TSG RAN WG1 Ad-Hoc Meeting 1901, R1-1900017, XP051592944, Jan. 20, 2019, total 15 pages, 3rd Generation Partnership Project, Valbonne, France (Jan. 21-25, 2019).

* cited by examiner

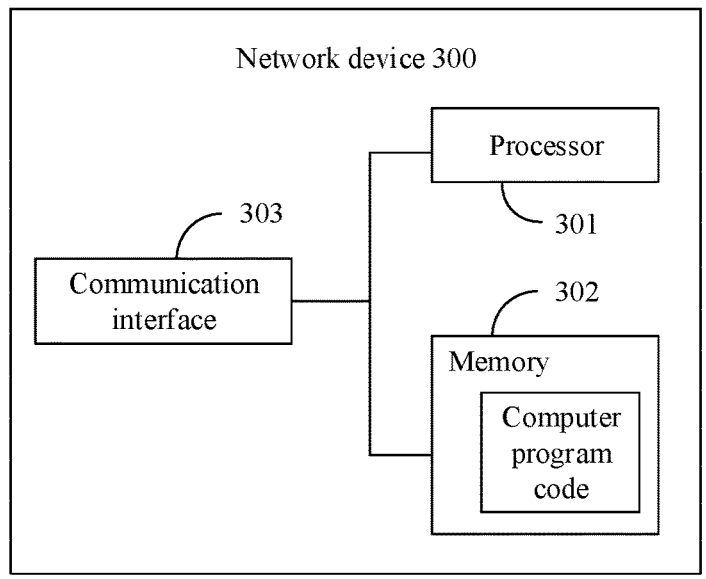
FIG. 3
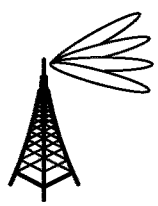 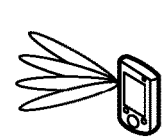
FIG. 4(A)
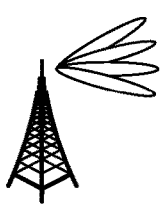 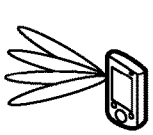
FIG. 4(B)
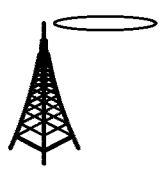 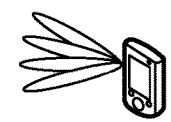
FIG. 4(C)
 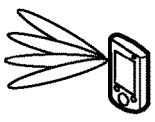
FIG. 4(D)
FIG. 4(E)
FIG. 4(F)

COMMUNICATION METHOD AND APPARATUS

CROSS-REFERENCE TO RELATED APPLICATIONS

This application is a continuation of International Application No. PCT/CN2020/079607, filed on Mar. 17, 2020, which claims priority to Chinese Patent Application No. 201910245843.0, filed on Mar. 28, 2019 and Chinese Patent Application No. 201910760399.6, filed on Aug. 16, 2019. All of the aforementioned patent applications are hereby incorporated by reference in their entireties.

TECHNICAL FIELD

Embodiments of this application relate to the communication field, and in particular, to a communication method and an apparatus.

BACKGROUND

In a communication system, different types of reference signals are usually used. A first type of reference signal is used for channel estimation, so that coherent demodulation can be performed on a received signal including control information or data information. A second type of reference signal, for example, a channel state information reference signal (CSI-RS), is used for channel state measurement or channel quality measurement, so that a terminal device is scheduled. The terminal device may obtain a spatial characteristic parameter based on the CSI-RS.

In long term evolution (LTE), the concept of a spatial correlation parameter is introduced. Assuming that a first reference signal and a second reference signal have a same spatial correlation parameter, a signal sent by using an antenna port corresponding to the first reference signal and a signal sent by using an antenna port corresponding to the second reference signal undergo same large-scale fading. A network device may indicate spatial correlation parameter information (for example, transmission configuration indicator (TCI) information or quasi-colocation (QCL) information) to the terminal device, to assist in describing a sending and receiving processing procedure of the terminal device.

In addition, in an ultra-reliable low-latency communication (URLLC) scenario in new radio (NR), to improve transmission reliability, a plurality of transport blocks (TB) need to be repeatedly sent, and the repeated TBs may be sent based on a plurality of pieces of spatial correlation parameter information. In a conventional technology, the spatial correlation parameter information can be mapped to only one TB. When the network device indicates that the plurality of pieces of spatial correlation parameter information are used to transmit the plurality of repeated TBs, the network device and the terminal device cannot determine a mapping relationship between the plurality of pieces of spatial correlation parameter information and the plurality of TBs, and therefore do not know which TB is received or sent based on which piece of spatial correlation parameter information.

SUMMARY

Embodiments of this application provide a communication method and an apparatus, so that a network device and a terminal device determine a mapping relationship between spatial correlation parameters and transport blocks when the transport blocks are repeatedly sent.

To achieve the foregoing objective, the following technical solutions are used in the embodiments of this application.

According to a first aspect, a communication method is provided, and includes: receiving first indication information, where the first indication information is used to indicate K spatial correlation parameters for receiving N transport blocks, the N transport blocks are same transport blocks, K and N are integers greater than 1, and K≤N; determining a mapping relationship between the K spatial correlation parameters and the N transport blocks; and receiving the N transport blocks based on the mapping relationship. According to the communication method provided in this embodiment of this application, a network device sends the first indication information to a terminal device. Correspondingly, the terminal device receives the first indication information from the network device. The first indication information is used to indicate the K spatial correlation parameters for receiving the N transport blocks. The network device and the terminal device determine the mapping relationship between the K spatial correlation parameters and the N transport blocks. The network device sends the N transport blocks based on the mapping relationship. Correspondingly, the terminal device receives the N transport blocks based on the mapping relationship. Alternatively, the terminal device sends the N transport blocks based on the mapping relationship. Correspondingly, the network device receives the N transport blocks based on the mapping relationship. In this way, when transport blocks are repeatedly sent, the network device and the terminal device learn, based on the mapping relationship, of which transport block is to be sent or received based on which spatial correlation parameter, to ensure reliable data transmission.

In a possible implementation, the determining a mapping relationship between the K spatial correlation parameters and the N transport blocks includes: determining the mapping relationship between the K spatial correlation parameters and the N transport blocks based on a multiplexing manner of the N transport blocks, where the multiplexing manner includes at least one of space division multiplexing, time division multiplexing, and frequency division multiplexing. A multiplexing manner, namely, time division multiplexing, can effectively reduce frequent beam switching. Because transport blocks that are close in frequency domain have more similar channel characteristics, a multiplexing manner, namely, frequency division multiplexing, can achieve a better transport block combination effect. In addition, the frequency division multiplexing manner can be used to complete transport block transmission more quickly, and a transmission delay can be reduced. A multiplexing manner, namely, space division multiplexing, can complete transport block transmission more quickly, and can further improve system performance.

In a possible implementation, one multiplexing manner is used for the N transport blocks, and the N transport blocks include K groups of transport blocks; and the mapping relationship between the K spatial correlation parameters and the N transport blocks includes: the K spatial correlation parameters arranged in a first order are sequentially mapped to the K groups of transport blocks arranged in an order corresponding to the multiplexing manner.

In a possible implementation, the mapping relationship between the K spatial correlation parameters and the N transport blocks includes: the K spatial correlation parameters arranged in a first order are sequentially mapped to the N transport blocks. That is, the spatial correlation parameters are arranged in the first order.

In a possible implementation, the mapping relationship between the K spatial correlation parameters and the N transport blocks includes: an $i^{th}$ spatial correlation parameter in the K spatial correlation parameters arranged in a first order is mapped to a $(K*j+i)^{th}$ transport block in the N transport blocks, where i and j are integers, $1 \le i \le K$, $1 \le K*j+i \le N$, $0 \le j \le \lceil M/K \rceil - 1$, and $\lceil \ \rceil$ represents rounding up. In this implementation, a mapping relationship between each spatial correlation parameter and a single transport block is described. It should be noted that, when $K \le N$, one spatial correlation parameter may be mapped to a plurality of transport blocks, so that it can be ensured that each transport block has a corresponding spatial correlation parameter.

In a possible implementation, one multiplexing manner is used for the N transport blocks, and the N transport blocks are arranged in an order corresponding to the multiplexing manner.

In a possible implementation, at least two multiplexing manners are used for the N transport blocks, the at least two multiplexing manners include a first multiplexing manner, the N transport blocks include M groups of transport blocks, M is a positive integer, and transport blocks in each group of transport blocks are arranged in an order corresponding to the first multiplexing manner.

In a possible implementation, two multiplexing manners are used for the N transport blocks, and the M groups of transport blocks are arranged in an order corresponding to a second multiplexing manner.

In a possible implementation, the first multiplexing manner is space division multiplexing, and the second multiplexing manner is time division multiplexing or frequency division multiplexing; the first multiplexing manner is time division multiplexing, and the second multiplexing manner is frequency division multiplexing; or the first multiplexing manner is frequency division multiplexing, and the second multiplexing manner is time division multiplexing. When the first multiplexing manner is space division multiplexing, a better space division multiplexing effect can be obtained. That is, preferentially mapping the K spatial correlation parameters to transport blocks that are space division multiplexed can obtain the better space division multiplexing effect. That the first multiplexing manner is frequency division multiplexing and the second multiplexing manner is time division multiplexing is applicable to a case in which the terminal device has a plurality of antenna panels. Optionally, the plurality of antenna panels are active. That the first multiplexing manner is time division multiplexing and the second multiplexing manner is frequency division multiplexing is applicable to a case in which the terminal device has a single antenna panel. Optionally, the single antenna panel is active.

In a possible implementation, three multiplexing manners are used for the N transport blocks, and the groups of transport blocks are first arranged in an order corresponding to a second multiplexing manner, and then arranged in an order corresponding to a third multiplexing manner.

In a possible implementation, the first multiplexing manner is space division multiplexing, the second multiplexing manner is time division multiplexing, and the third multiplexing manner is frequency division multiplexing; or the first multiplexing manner is space division multiplexing, the second multiplexing manner is frequency division multiplexing, and the third multiplexing manner is time division multiplexing.

In a possible implementation, the K spatial correlation parameters arranged in the first order are sequentially mapped to the resources that are arranged in the order corresponding to the first multiplexing manner and that are in each group of resources, and then are repeatedly mapped to the groups of resources. In other words, N resources may be arranged in an order that is first intra-group and then inter-group. The K spatial correlation parameters arranged in the first order may be sequentially cyclically mapped to the N resources arranged in the order.

In a possible implementation, the first order is an ascending order of identifiers of the spatial correlation parameters, a descending order of the identifiers of the spatial correlation parameters, or an order of the K spatial correlation parameters indicated by the first indication information.

In a possible implementation, an order corresponding to a multiplexing manner, namely, space division multiplexing, is an ascending order of indexes of demodulation reference signal ports, a descending order of the indexes of the demodulation reference signal ports, an ascending order of indexes of demodulation reference signal port groups, a descending order of the indexes of the demodulation reference signal port groups, an ascending order of indexes of demodulation reference signal port groups indicated by an antenna port field, a descending order of the indexes of the demodulation reference signal port groups indicated by the antenna port field, an ascending order of indexes of demodulation reference signal ports indicated by the antenna port field, a descending order of the indexes of the demodulation reference signal ports indicated by the antenna port field, an order of the indexes of the demodulation reference signal port groups indicated by the antenna port field, or an order of the indexes of the demodulation reference signal ports indicated by the antenna port field; and each one or more demodulation reference signal ports or demodulation reference signal port groups are used to demodulate one of the N transport blocks.

In a possible implementation, an order corresponding to a multiplexing manner, namely, space division multiplexing, is an ascending order of indexes of demodulation reference signal ports, a descending order of the indexes of the demodulation reference signal ports, an ascending order of indexes of demodulation reference signal port groups, a descending order of the indexes of the demodulation reference signal port groups, an ascending order of indexes of demodulation reference signal port groups indicated by an antenna port field, a descending order of the indexes of the demodulation reference signal port groups indicated by the antenna port field, an ascending order of indexes of demodulation reference signal ports indicated by the antenna port field, a descending order of the indexes of the demodulation reference signal ports indicated by the antenna port field, an order of the indexes of the demodulation reference signal port groups indicated by the antenna port field, or an order of the indexes of the demodulation reference signal ports indicated by the antenna port field; and each one or more demodulation reference signal ports or demodulation reference signal port groups correspond to one of the N resources.

In a possible implementation, an order corresponding to a multiplexing manner, namely, time division multiplexing, is an ascending order of indexes of time domain resources or a descending order of the indexes of the time domain resources, and each time domain resource is used to carry one of the N transport blocks.

In a possible implementation, an order corresponding to a multiplexing manner, namely, frequency division multiplexing, is an ascending order of indexes of frequency domain resources or a descending order of the indexes of the frequency domain resources, where each frequency domain resource is used to carry one of the N transport blocks.

In a possible implementation, the spatial correlation parameter is spatial correlation information or transmission configuration indicator TCI information. That is, the implementation provided in this embodiment of this application may be used for PDSCH transmission, and may also be used for PUSCH transmission.

In a possible implementation, multiplexing manners, namely, time division multiplexing, and frequency division multiplexing, are used for the N transport blocks, and the N transport blocks include M groups of transport blocks; and the mapping relationship between the K spatial correlation parameters and the N transport blocks includes: an $i^{th}$ spatial correlation parameter in the K spatial correlation parameters arranged in a first order is mapped to a $(K*j+i)^{th}$ group of transport blocks in the M groups of transport blocks, where i and j are integers, $1 \le i \le K$, $1 \le K*j+i \le M$, $0 \le j \le \lceil M/K \rceil -1$, and $\lceil \ \rceil$ represents rounding up.

The mapping relationship between the K spatial correlation parameters and the N transport blocks may be configured by the network device, may be predefined in a protocol, or may be determined by the terminal device based on a frequency domain spacing or a time domain spacing between at least two transport blocks. For example, when a frequency domain spacing or a time domain spacing between adjacent transport blocks in the N transport blocks is greater than a first threshold, a manner in which the K spatial correlation parameters arranged in the first order are sequentially mapped to the N transport blocks or a manner in which the $i^{th}$ spatial correlation parameter in the K spatial correlation parameters arranged in the first order is mapped to the $(K*j+i)^{th}$ transport block in the N transport blocks may be used. In this manner, a better diversity gain can be obtained when a frequency domain spacing or a time domain spacing between transport blocks is larger. When the frequency domain spacing or the time domain spacing between the adjacent transport blocks in the N transport blocks is less than the first threshold, a manner in which the K spatial correlation parameters arranged in the first order are sequentially mapped to the K groups of transport blocks arranged in the order corresponding to the multiplexing manner may be used. In this manner, frequent beam switching and excessive channel estimation can be avoided when the frequency domain spacing or the time domain spacing between the transport blocks is smaller, thereby reducing implementation complexity of the terminal device.

According to a second aspect, a communication method is provided, and includes: sending first indication information, where the first indication information is used to indicate K spatial correlation parameters for receiving N transport blocks, the N transport blocks are same transport blocks, K and N are integers greater than 1, and $K \le N$; determining a mapping relationship between the K spatial correlation parameters and the N transport blocks; and sending the N transport blocks based on the mapping relationship. According to the communication method provided in this embodiment of this application, a network device sends the first indication information to a terminal device. Correspondingly, the terminal device receives the first indication information from the network device. The first indication information is used to indicate the K spatial correlation parameters for receiving the N transport blocks. The network device and the terminal device determine the mapping relationship between the K spatial correlation parameters and the N transport blocks. The network device sends the N transport blocks based on the mapping relationship. Correspondingly, the terminal device receives the N transport blocks based on the mapping relationship. Alternatively, the terminal device sends the N transport blocks based on the mapping relationship. Correspondingly, the network device receives the N transport blocks based on the mapping relationship. In this way, when transport blocks are repeatedly sent, the network device and the terminal device learn, based on the mapping relationship, of which transport block is to be sent or received based on which spatial correlation parameter, to ensure reliable data transmission.

In a possible implementation, the determining a mapping relationship between the K spatial correlation parameters and the N transport blocks includes: determining the mapping relationship between the K spatial correlation parameters and the N transport blocks based on a multiplexing manner of the N transport blocks, where the multiplexing manner includes at least one of space division multiplexing, time division multiplexing, and frequency division multiplexing.

In a possible implementation, one multiplexing manner is used for the N transport blocks, and the N transport blocks include K groups of transport blocks; and the mapping relationship between the K spatial correlation parameters and the N transport blocks includes: the K spatial correlation parameters arranged in a first order are sequentially mapped to the K groups of transport blocks arranged in an order corresponding to the multiplexing manner.

In a possible implementation, the mapping relationship between the K spatial correlation parameters and the N transport blocks includes: the K spatial correlation parameters arranged in a first order are sequentially mapped to the N transport blocks. That is, the spatial correlation parameters are arranged in the first order.

In a possible implementation, the mapping relationship between the K spatial correlation parameters and the N transport blocks includes: an $i^{th}$ spatial correlation parameter in the K spatial correlation parameters arranged in a first order is mapped to a $(K*j+i)^{th}$ transport block in the N transport blocks, where i and j are integers, $1 \le i \le K$, $1 \le K*j+i \le N$, $0 \le j \le \lceil M/K \rceil -1$, and $\lceil \ \rceil$ represents rounding up. In this implementation, a mapping relationship between each spatial correlation parameter and a single transport block is described.

In a possible implementation, one multiplexing manner is used for the N transport blocks, and the N transport blocks are arranged in an order corresponding to the multiplexing manner.

In a possible implementation, at least two multiplexing manners are used for the N transport blocks, the at least two multiplexing manners include a first multiplexing manner, the N transport blocks include M groups of transport blocks, M is a positive integer, and transport blocks in each group of transport blocks are arranged in an order corresponding to the first multiplexing manner.

In a possible implementation, two multiplexing manners are used for the N transport blocks, and the M groups of transport blocks are arranged in an order corresponding to a second multiplexing manner.

In a possible implementation, the first multiplexing manner is space division multiplexing, and the second multiplexing manner is time division multiplexing or frequency division multiplexing; the first multiplexing manner is time division multiplexing, and the second multiplexing manner is frequency division multiplexing; or the first multiplexing manner is frequency division multiplexing, and the second multiplexing manner is time division multiplexing. When the first multiplexing manner is space division multiplexing, a better space division multiplexing effect can be obtained. That is, preferentially mapping the K spatial correlation parameters to transport blocks that are space division multiplexed can obtain the better space division multiplexing effect. That the first multiplexing manner is frequency division multiplexing and the second multiplexing manner is time division multiplexing is applicable to a case in which the terminal device has a plurality of antenna panels. Optionally, the plurality of antenna panels are active. That the first multiplexing manner is time division multiplexing and the second multiplexing manner is frequency division multiplexing is applicable to a case in which the terminal device has a single antenna panel. Optionally, the single antenna panel is active.

In a possible implementation, the K spatial correlation parameters arranged in the first order are sequentially mapped to the resources that are arranged in the order corresponding to the first multiplexing manner and that are in each group of resources, and then are repeatedly mapped to the groups of resources. In other words, N resources may be arranged in an order that is first intra-group and then inter-group. The K spatial correlation parameters arranged in the first order may be sequentially cyclically mapped to the N resources arranged in the order.

In a possible implementation, three multiplexing manners are used, and the groups of transport blocks are first arranged in an order corresponding to a second multiplexing manner, and then arranged in an order corresponding to a third multiplexing manner.

In a possible implementation, the first multiplexing manner is space division multiplexing, the second multiplexing manner is time division multiplexing, and the third multiplexing manner is frequency division multiplexing; or the first multiplexing manner is space division multiplexing, the second multiplexing manner is frequency division multiplexing, and the third multiplexing manner is time division multiplexing.

In a possible implementation, the first order is an ascending order of identifiers of the spatial correlation parameters, a descending order of the identifiers of the spatial correlation parameters, or an order of the K spatial correlation parameters indicated by the first indication information.

In a possible implementation, an order corresponding to a multiplexing manner, namely, space division multiplexing, is an ascending order of indexes of demodulation reference signal ports, a descending order of the indexes of the demodulation reference signal ports, an ascending order of indexes of demodulation reference signal port groups, a descending order of the indexes of the demodulation reference signal port groups, an ascending order of indexes of demodulation reference signal port groups indicated by an antenna port field, a descending order of the indexes of the demodulation reference signal port groups indicated by the antenna port field, an ascending order of indexes of demodulation reference signal ports indicated by the antenna port field, a descending order of the indexes of the demodulation reference signal ports indicated by the antenna port field, an order of the indexes of the demodulation reference signal port groups indicated by the antenna port field, or an order of the indexes of the demodulation reference signal ports indicated by the antenna port field; and each one or more demodulation reference signal ports or demodulation reference signal port groups are used to demodulate one of the N transport blocks.

In a possible implementation, an order corresponding to a multiplexing manner, namely, space division multiplexing, is an ascending order of indexes of demodulation reference signal ports, a descending order of the indexes of the demodulation reference signal ports, an ascending order of indexes of demodulation reference signal port groups, a descending order of the indexes of the demodulation reference signal port groups, an ascending order of indexes of demodulation reference signal port groups indicated by an antenna port field, a descending order of the indexes of the demodulation reference signal port groups indicated by the antenna port field, an ascending order of indexes of demodulation reference signal ports indicated by the antenna port field, a descending order of the indexes of the demodulation reference signal ports indicated by the antenna port field, an order of the indexes of the demodulation reference signal port groups indicated by the antenna port field, or an order of the indexes of the demodulation reference signal ports indicated by the antenna port field; and each one or more demodulation reference signal ports or demodulation reference signal port groups correspond to one of the N resources.

In a possible implementation, an order corresponding to a multiplexing manner, namely, time division multiplexing, is an ascending order of indexes of time domain resources or a descending order of the indexes of the time domain resources, and each time domain resource is used to carry one of the N transport blocks.

In a possible implementation, an order corresponding to a multiplexing manner, namely, frequency division multiplexing, is an ascending order of indexes of frequency domain resources or a descending order of the indexes of the frequency domain resources, where each frequency domain resource is used to carry one of the N transport blocks.

In a possible implementation, the spatial correlation parameter is spatial correlation information or transmission configuration indicator TCI information. That is, the implementation provided in this embodiment of this application may be used for PDSCH transmission, and may also be used for PUSCH transmission.

In a possible implementation, multiplexing manners, namely, time division multiplexing, and frequency division multiplexing, are used for the N transport blocks, and the N transport blocks include M groups of transport blocks; and the mapping relationship between the K spatial correlation parameters and the N transport blocks includes: an $i^{th}$ spatial correlation parameter in the K spatial correlation parameters arranged in a first order is mapped to a $(K*j+i)^{th}$ group of transport blocks in the M groups of transport blocks, where i and j are integers, $1 \leq i \leq K$, $1 \leq K*j+i \leq M$, $0 \leq j \leq \lceil M/K \rceil - 1$, and $\lceil \ \rceil$ represents rounding up.

The mapping relationship between the K spatial correlation parameters and the N transport blocks may be configured by the network device, may be predefined in a protocol, or may be determined by the terminal device based on a frequency domain spacing or a time domain spacing between at least two transport blocks. For example, when a frequency domain spacing or a time domain spacing between adjacent transport blocks in the N transport blocks is greater than a first threshold, a manner in which the K spatial correlation parameters arranged in the first order are sequentially mapped to the N transport blocks or a manner in which the $i^{th}$ spatial correlation parameter in the K spatial correlation parameters arranged in the first order is mapped to the $(K*j+i)^{th}$ transport block in the N transport blocks may be used. In this manner, a better diversity gain can be obtained when a frequency domain spacing or a time domain spacing between transport blocks is larger. When the frequency domain spacing or the time domain spacing between the adjacent transport blocks in the N transport blocks is less than the first threshold, a manner in which the K spatial correlation parameters arranged in the first order are sequentially mapped to the K groups of transport blocks arranged in the order corresponding to the multiplexing manner may be used. In this manner, frequent beam switching and excessive channel estimation can be avoided when the frequency domain spacing or the time domain spacing between the transport blocks is smaller, thereby reducing implementation complexity of the terminal device.

According to a third aspect, a terminal device is provided, includes a processing module and a transceiver module, and is configured to perform the communication method according to any one of the first aspect and the implementations of the first aspect. Specifically, the transceiver module is configured to receive first indication information, where the first indication information is used to indicate K spatial correlation parameters for receiving N transport blocks, the N transport blocks are same transport blocks, K and N are integers greater than 1, and K≤N; the processing module is configured to determine a mapping relationship between the K spatial correlation parameters and the N transport blocks; the transceiver module is further configured to receive the N transport blocks based on the mapping relationship.

In a possible implementation, the processing module is specifically configured to determine the mapping relationship between the K spatial correlation parameters and the N transport blocks based on a multiplexing manner of the N transport blocks, where the multiplexing manner includes at least one of space division multiplexing, time division multiplexing, and frequency division multiplexing.

According to a fourth aspect, a network device is provided, includes a processing module and a transceiver module, and is configured to perform the communication method according to any one of the second aspect and the implementations of the second aspect. Specifically, the transceiver module is configured to send first indication information, where the first indication information is used to indicate K spatial correlation parameters for receiving N transport blocks, the N transport blocks are same transport blocks, K and N are integers greater than 1, and K≤N; the processing module is configured to determine a mapping relationship between the K spatial correlation parameters and the N transport blocks; the transceiver module is further configured to send the N transport blocks based on the mapping relationship.

In a possible implementation, the processing module is specifically configured to determine the mapping relationship between the K spatial correlation parameters and the N transport blocks based on a multiplexing manner of the N transport blocks, where the multiplexing manner includes at least one of space division multiplexing, time division multiplexing, and frequency division multiplexing.

According to a fifth aspect, a communication apparatus is provided, and includes a processor and a memory. The memory is configured to store a program. The processor invokes the program stored in the memory, to perform the communication method according to the first aspect.

According to a sixth aspect, a communication apparatus is provided, and includes a processor and a memory. The memory is configured to store a program. The processor invokes the program stored in the memory, to perform the communication method according to the second aspect.

According to a seventh aspect, a computer-readable storage medium is provided. The computer-readable storage medium stores instructions. When the instructions are run on a computer or a processor, the computer or the processor is enabled to perform the communication method according to any one of the first aspect or the possible implementations of the first aspect, or perform the communication method according to any one of the second aspect or the possible implementations of the second aspect.

According to an eighth aspect, a computer program product including instructions is provided. When the instructions are run on a computer or a processor, the computer or the processor is enabled to perform the communication method according to any one of the first aspect or the possible implementations of the first aspect, or perform the communication method according to any one of the second aspect or the possible implementations of the second aspect.

According to a ninth aspect, a communication system is provided, and includes the terminal device according to the third aspect and the network device according to the fourth aspect, or includes the communication apparatus according to the fifth aspect and the communication apparatus according to the sixth aspect.

For technical effects of the third aspect to the ninth aspect, refer to the content in the possible implementations of the first aspect and the second aspect.

BRIEF DESCRIPTION OF DRAWINGS

FIG. 3 is a schematic structural diagram 1 of a network device according to an embodiment of this application;

FIG. 4(A) to FIG. 4(F) are schematic diagrams of beam training according to an embodiment of this application;

DESCRIPTION OF EMBODIMENTS

Embodiments of this application may be applied to a time division duplex (TDD) scenario, and also applicable to a frequency division duplex (FDD) scenario.

The embodiments of this application are described based on a fifth generation (5th generation, 5G) communication network scenario in a wireless communication network. It should be noted that, the solutions in the embodiments of this application may alternatively be applied to another wireless communication network such as a sixth generation mobile communication system, and a corresponding name may also be replaced with a name of a corresponding function in the another wireless communication network. A 5G mobile communication system in this application includes a non-standalone (NSA) 5G mobile communication system and/or a standalone (SA) 5G mobile communication system.

The embodiments of this application are applicable to a long term evolution (LTE) system such as an NB-IoT system, or are applicable to a long term evolution-advanced (LTE-Advanced, LTE-A) system. The embodiments of this application are alternatively applicable to other wireless communication systems such as a global system for mobile communication (GSM), a universal mobile telecommunications system (UMTS), a code division multiple access (CDMA) system, and a new network device system. Specific embodiments are described by using the LTE system as an example below.

Figure 1:
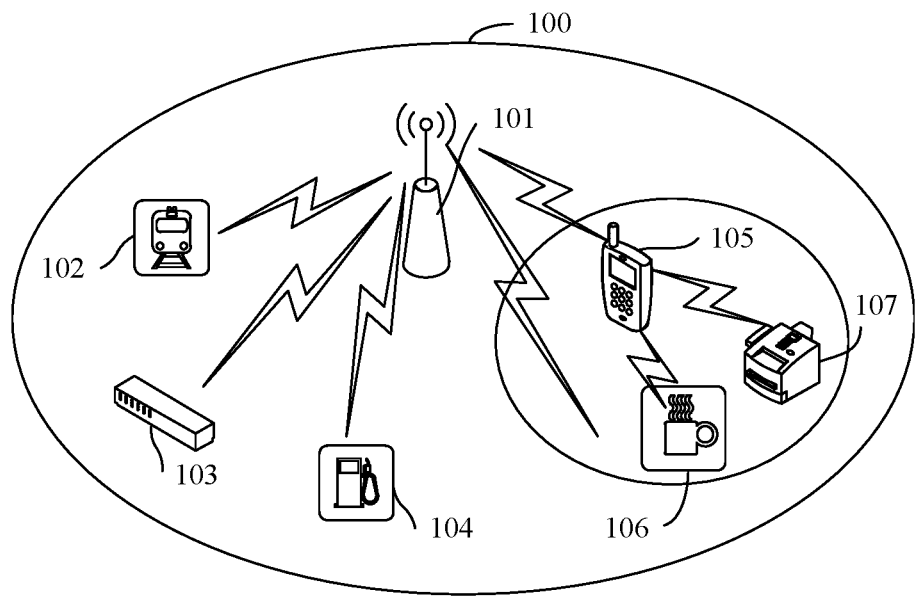
FIG. 1 is a schematic architectural diagram of a communication system according to an embodiment of this application.

As shown in FIG. 1, a communication system 100 provided in an embodiment of this application includes a network device 101 and terminal devices 102 to 107.

The terminal device in the embodiments of this application may be a device that provides a user with voice and/or data connectivity, a handheld device having a wireless connection function, or another processing device connected to a wireless modem. A wireless terminal may communicate with one or more core networks through a radio access network (RAN). The wireless terminal may be a mobile terminal such as a mobile phone (also referred to as a "cellular" phone) and a computer having a mobile terminal, for example, may be a portable, pocket-sized, handheld, computer built-in, or in-vehicle mobile apparatus, which exchanges voice and/or data with the radio access network. For example, the wireless terminal is a device such as user equipment (UE), a personal communication service (PCS) phone, a cordless phone, a session initiation protocol (SIP) phone, a wireless local loop (WLL) station, and a personal digital assistant (PDA). The wireless terminal may also be referred to as a system, a subscriber unit, a subscriber station, a mobile station, a mobile, a remote station, an access point, a remote terminal, an access terminal, a user terminal, a user agent, a user device, or user equipment. For example, the terminal device may be the high-speed railway communication device 102, the smart air conditioner 103, the smart fuel dispenser 104, the mobile phone 105, the smart teacup 106, the printer 107, or the like. This is not limited in this application.

The network device in the embodiments of this application may be a base station. The base station may be configured to mutually convert a received over-the-air frame and an internet protocol (IP) packet, and serves as a router between the wireless terminal and a rest portion of an access network, where the rest portion of the access network may include an IP network device. The base station may further coordinate attribute management of an air interface. For example, the base station may be a base transceiver station (BTS) in GSM or CDMA, may be a NodeB in wideband code division multiple access (WCDMA), may be an evolved NodeB (eNB or e-NodeB) in LTE, or may be a gNB in 5G. This is not limited in the embodiments of this application. The foregoing base station is merely an example for description. The network device may alternatively be a relay station, an access point, a vehicle-mounted device, a wearable device, or a device of another type.

Figure 2:
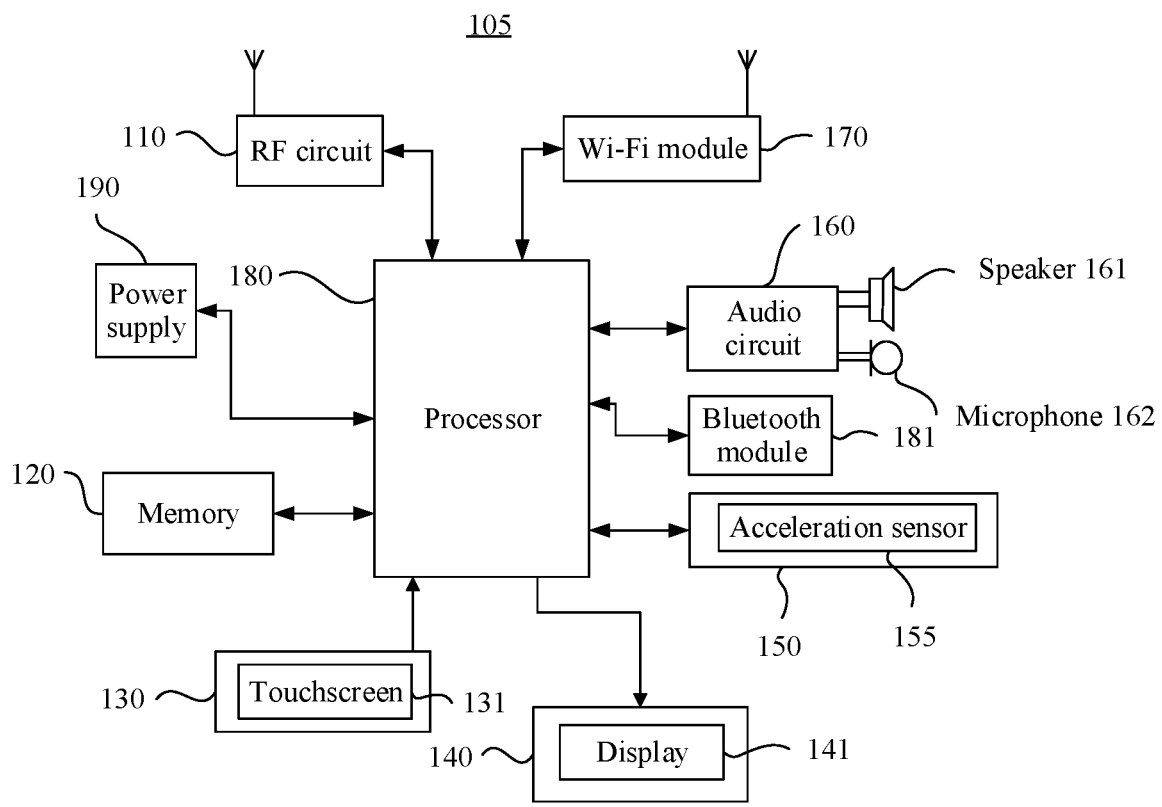
FIG. 2 is a schematic structural diagram 1 of a terminal device according to an embodiment of this application.

As shown in FIG. 2, an example in which the terminal device is a mobile phone is used to describe a structure of the terminal device.

The terminal device 105 may include components such as a radio frequency (RF) circuit 110, a memory 120, an input unit 130, a display unit 140, a sensor 150, an audio circuit 160, a wireless fidelity (Wi-Fi) module 170, a processor 180, a Bluetooth module 181, and a power supply 190.

The RF circuit 110 may be configured to receive and send a signal during information receiving and sending or during a call. The RF circuit 110 may receive downlink data from a base station and then deliver the downlink data to the processor 180 for processing, and may send uplink data to the base station. Usually, the RF circuit includes but is not limited to devices such as an antenna, at least one amplifier, a transceiver, a coupler, a low noise amplifier, and a duplexer.

The memory 120 may be configured to store a software program and data. The processor 180 runs the software program or the data stored in the memory 120, to perform various functions of the terminal device 105 and process data. The memory 120 may include a high-speed random access memory, and may further include a nonvolatile memory, for example, at least one magnetic disk storage device, a flash memory device, or another volatile solid-state storage device. The memory 120 stores an operating system that supports running of the terminal device 105, for example, an iOS® operating system developed by Apple, an Android® open-source operating system developed by Google, and a Windows® operating system developed by Microsoft. The memory 120 in this application may store the operating system and various application programs, and may further store code for performing the method in the embodiments of this application.

The input unit 130 (for example, a touchscreen) may be configured to receive input digit or character information, and generate signal input related to user setting and function control of the terminal device 105. Specifically, the input unit 130 may include a touchscreen 131 disposed on a front surface of the terminal device 105, and may collect a touch operation of a user on or near the touchscreen 131.

The display unit 140 (namely, a display) may be configured to display information input by the user or information provided for the user and graphical user interfaces (GUI) of various menus of the terminal device 105. The display unit 140 may include a display 141 disposed on the front surface of the terminal device 105. The display 141 may be configured in a form of a liquid crystal display, a light emitting diode, or the like. The display unit 140 may be configured to display the various graphical user interfaces in this application. The touchscreen 131 may cover the display 141, or the touchscreen 131 may be integrated with the display 141 to implement input and output functions of the terminal device 105. After integration, the touchscreen 131 and the display 141 may be referred to as a touch display screen for short.

The terminal device 105 may further include at least one type of sensor 150, for example, an acceleration sensor 155, an optic sensor, and a movement sensor. Other sensors such as a gyroscope, a barometer, a hygrometer, a thermometer, and an infrared sensor may be further configured for the terminal device 105.

The audio circuit 160, a speaker 161, and a microphone 162 may provide an audio interface between the user and the terminal device 105. The audio circuit 160 may transmit, to the speaker 161, a received electric signal obtained after audio data conversion, and the speaker 161 converts the electric signal into a sound signal for output. In addition, the microphone 162 converts a collected sound signal into an electric signal. The audio circuit 160 receives the electric signal, then converts the electric signal into audio data, and outputs the audio data to the RF circuit 110, to send the audio data to, for example, another terminal, or outputs the audio data to the memory 120 for further processing.

Wi-Fi is a short-range wireless transmission technology. The terminal device 105 may help, by using the Wi-Fi module 170, the user to receive and send an email, browse a web page, access streaming media, and the like. The Wi-Fi module 170 provides wireless broadband internet access for the user.

The processor 180 is a control center of the terminal device 105, is connected to each part of the entire terminal by using various interfaces and lines, and performs the various functions of the terminal device 105 and process the data by running or executing the software program stored in the memory 120 and invoking the data stored in the memory 120. In some embodiments, the processor 180 may include one or more processing units. An application processor and a baseband processor may be further integrated into the processor 180. The application processor mainly processes the operating system, a user interface, the application programs, and the like. The baseband processor mainly processes wireless communication. It may be understood that the baseband processor may alternatively not be integrated into the processor 180. The processor 180 in this application may run the operating system, the application programs, user interface display, touch response, and the communication method in the embodiments of this application.

The Bluetooth module 181 is configured to exchange information, through a Bluetooth protocol, with another Bluetooth device having a Bluetooth module. For example, the terminal device 105 may establish, through the Bluetooth module 181, a Bluetooth connection to a wearable electronic device (for example, a smartwatch) that also has a Bluetooth module, to exchange data.

The terminal device 105 further includes the power supply 190 (for example, a battery) that supplies power to various components. The power supply may be logically connected to the processor 180 through a power management system, to implement functions such as charging, discharging, and power consumption management through the power management system.

As shown in FIG. 3, an embodiment of this application provides a schematic structural diagram of a network device. The network device 300 includes at least one processor 301, at least one memory 302, and at least one communication interface 303. The at least one processor 301, the at least one memory 302, and the at least one communication interface 303 may be connected by using a bus.

The memory 302 is configured to store computer program code.

The processor 301 is configured to invoke the computer program code stored in the memory 302, to perform functions of the network device in the following method embodiments.

The communication interface 303 is configured to communicate with another communication apparatus such as a terminal device. The communication interface 303 may perform communication in a wireless communication manner.

The following describes concepts in this application.
Control Resource Set (CORESET):

To improve efficiency of blindly detecting a control channel by a terminal device, the concept of the control resource set is proposed in an NR standard formulation process. A network device may configure one or more resource sets for the terminal device, to send a physical downlink control channel (PDCCH). The network device may send the PDCCH to the terminal device on any control resource set corresponding to the terminal device. In addition, the network device may further notify the terminal device of other configuration information, for example, a search space set, of the control resource set. Configuration information of all control resource sets varies. For example, frequency-domain widths vary, or time-domain lengths vary. It is extensible that the control resource set in this application may be a CORESET, a control region, or an enhanced physical downlink control channel (ePDCCH) set that is defined in a 5G mobile communication system.

Antenna Port:

The antenna port is referred to as a port for short, and refers to a transmit antenna identified by a device or a transmit antenna that can be distinguished in space. Each antenna port is configured to configure one virtual antenna. Each virtual antenna may be a weighted combination of a plurality of physical antennas, and each antenna port may correspond to one reference signal port.

Quasi-Colocation (QCL) Information:

QCL may also be referred to as quasi co-site. The QCL information is used to assist in describing receive-side beamforming information and a receiving processing procedure of the terminal device. The QCL information may indicate a QCL relationship between a target reference signal and a source reference signal. The target reference signal may include a demodulation reference signal (DMRS), a channel state information reference signal (CSI-RS), or the like. The source reference signal may include a CSI-RS, a tracking reference signal (TRS), a synchronization signal/physical broadcast channel block (SSB), or the like. Spatial characteristic parameters of the source reference signal and the target reference signal that satisfy the QCL relationship are the same, so that a spatial characteristic parameter of the target reference signal can be inferred based on a resource index of the source reference signal. A spatial characteristic parameter includes at least one of the following parameters:

an angle of arrival (AoA), a dominant angle of arrival, an average angle of arrival, a power angular spectrum (PAS) of the angle of arrival, an angle of departure (AoD), a dominant angle of departure, an average angle of departure, a power angular spectrum of the angle of departure, terminal transmit beamforming, terminal receive beamforming, spatial channel correlation, base station transmit beamforming, base station receive beamforming, an average channel gain, an average channel delay (average delay), a delay spread, a Doppler spread, a Doppler shift, a spatial reception parameter (spatial Rx parameter), and the like.

The QCL information describes a characteristic of a spatial channel between an antenna port for the source reference signal and an antenna port for the target reference signal, and help the terminal device complete receive-side beamforming or a receiving processing process based on the QCL information.

To reduce overheads of indicating the QCL information by the network device to the terminal device, in an optional implementation, a network device side may indicate that a demodulation reference signal of the PDCCH or a physical downlink shared channel (PDSCH) and at least one of a plurality of reference signal resources previously reported by the terminal device satisfy a QCL relationship. For example, it is assumed that the terminal device reports at least one CSI-RS resource index, and each CSI-RS resource index corresponds to one transmit-receive beam pair previously established during measurement performed based on the CSI-RS resource. The QCL information indicated by the network device indicates that the demodulation reference signal of the PDCCH or the PDSCH and at least one of the foregoing CSI-RS resources satisfy the QCL relationship. Because information about receive beams of two reference signals that satisfy a QCL relationship is the same, the terminal device may infer, based on the QCL information and the CSI-RS resource index, information about a receive beam for receiving the PDCCH or the PDSCH.

Four types of QCL information are defined in an existing standard. The network device may simultaneously configure at least one type (type) of QCL for the terminal device, for example, QCL types A+D and QCL types C+D. Details are as follows.

The QCL type A includes the Doppler shift, the Doppler spread, the average channel delay (average delay), and the delay spread.

A QCL type B includes the Doppler shift and the Doppler spread.

The QCL type C includes the average channel delay and the Doppler shift.

The QCL type D includes the spatial reception parameter (spatial Rx parameter).

Spatial Relation Information:

The spatial relation information is used to assist in describing beamforming information on a transmit side of the terminal device and a transmit processing procedure. The spatial relation information may indicate a spatial reception parameter relationship between a source reference signal and a target reference signal, where the target reference signal may include a DMRS, a sounding reference signal (SRS), or the like, and the source reference signal may include a CSI-RS, an SRS, an SSB, or the like. Spatial characteristic parameters of the source reference signal and the target reference signal that satisfy the spatial relation information are the same, so that a spatial characteristic parameter of the target reference signal can be inferred based on a resource index of the source reference signal. For a spatial characteristic parameter, refer to the foregoing description. Details are not repeated herein.

The spatial relation information describes a characteristic of a spatial channel between an antenna port for the source reference signal and an antenna port for the target reference signal, and help the terminal device complete a transmit-side beamforming or the transmitting processing process based on the spatial relation information.

Transmission Configuration Indicator (TCI) Information:

The TCI information is used to indicate a QCL relationship between two types of reference signals, for example, QCL information of the PDCCH/CORESET or the PDSCH. The TCI information means that a reference signal included in a TCI and the DMRS of the PDCCH/PDSCH satisfy a QCL relationship, and is mainly used to indicate that when the PDCCH/PDSCH is received, information such as a spatial reception parameter of the PDCCH/PDSCH is the same as or similar to information such as a spatial reception parameter of the reference signal included in the TCI.

Synchronization Signal/Physical Broadcast Channel Block (SSB):

The SSB includes at least one of a primary synchronization signal (PSS), a secondary synchronization signal (SSS), and a physical broadcast channel (PBCH), and is signal mainly used for cell search, cell synchronization, and broadcast information carrying.

Beam:

The beam is a communication resource. The beam may be a wide beam, a narrow beam, or another type of beam. A technology for forming the beam may be a beamforming technology or another technology. The beamforming technology may include a digital beamforming technology, an analog beamforming technology, and a hybrid digital/analog beamforming technology. Different beams may be considered as different resources. Same information or different information may be sent by using the different beams.

Optionally, a plurality of beams having a same communication feature or similar communication features may be considered as one beam. One beam may correspond to one or more antenna ports, and is used to transmit a data channel, a control channel, a sounding signal, and the like. A transmit beam may refer to distribution of signal strength formed in different directions in space after a radio signal is transmitted through an antenna, and a receive beam may refer to distribution of signal strength that is of a radio signal received from an antenna and that is in different directions in space. It can be understood that the one or more antenna ports forming the beam may alternatively be considered as one antenna port set.

Beams may be classified into a transmit beam and a receive beam of the network device and a transmit beam and a receive beam of the terminal device. The transmit beam of the network device is used to describe transmit-side beamforming information of the network device, and the receive beam of the network device is used to describe receive-side beamforming information of the network device. The transmit beam of the terminal device is used to describe transmit-side beamforming information of the terminal device, and the receive beam of the terminal device is used to describe the receive-side beamforming information of the terminal device. That is, the beam is used to describe beamforming information.

The beam may correspond to a time resource, a space resource, and a frequency domain resource.

Optionally, the beam may alternatively correspond to a reference signal resource (for example, a reference signal resource for beamforming) or the beamforming information.

Optionally, the beam may alternatively correspond to information associated with a reference signal resource of the network device. A reference signal may be a CSI-RS, an SSB, a DMRS, a phase tracking signal (phase tracking reference signal, PTRS), a tracking signal (tracking reference signal, TRS), or the like. The information associated with the reference signal resource may be a reference signal resource index, QCL information (especially QCL information of a type D), or the like. The reference signal resource index corresponds to one transmit-receive beam pair previously established during measurement performed based on the reference signal. The terminal device may infer beam information of the transmit-receive beam pair based on the reference signal resource index.

Optionally, the beam may alternatively correspond to a spatial domain filter (spatial filter/spatial domain filter), a spatial domain transmission filter (spatial domain transmission filter), a spatial filter, or a spatial transmission filter. The receive beam may be equivalent to the spatial transmission filter, the spatial domain transmission filter, a spatial domain receiving filter, or a spatial receiving filter. The transmit beam may be equivalent to the spatial domain filter, the spatial domain transmission filter, a spatial domain sending filter, or a spatial sending filter. Information about a spatial correlation parameter is equivalent to the spatial filter (spatial domain transmission/receive filter).

Optionally, the spatial filter usually includes the spatial sending filter and/or the spatial receiving filter. The spatial filter may also be referred to as the spatial domain sending filter, the spatial domain receiving filter, the spatial transmission filter, the spatial domain transmission filter, or the like. Optionally, a receive beam on a terminal device side and a transmit beam on the network device side may be downlink spatial filters, and a transmit beam on the terminal device side and a receive beam on the network device side may be uplink spatial filters.

As a communication system gradually starts to use a high frequency band having a larger available bandwidth for communication, the high frequency band causes a larger path loss. Therefore, the beamforming technology is introduced to obtain a larger antenna gain, to offset such a path loss.

When a signal is transmitted based on the beamforming technology, once the terminal device moves, a direction of a corresponding shaped beam for transmitting the signal no longer matches a location that is after moving. Consequently, signal receiving is frequently interrupted. Compared with cell handover, the terminal device switches between different shaped beams more dynamically and frequently. To track a shaped beam change in a signal transmission process, a method for measuring channel quality based on the beamforming technology and reporting a channel quality measurement result is introduced. The channel quality may be measured based on a beamformed synchronization signal or cell-specific reference signal. Similar to reporting of CSI information, reporting of the channel quality measurement result of the shaped beam may also be sent by the terminal device to the network device by using a physical uplink control channel (PUCCH) or a physical uplink shared channel (PUSCH).

Specifically, FIG. 4(A) to FIG. 4(F) show a beam training process of beamforming.

FIG. 4(E) shows a training process of transmit beams of a network device. A terminal device selects N better beams by measuring the plurality of beams sent by the network device, and reports beam measurement information of the N better beams to the network device. FIG. 4(D) shows a training process of transmit beams of a terminal device. A network device selects M better beams by measuring the plurality of beams sent by the terminal device, and may indicate, to the terminal device, the better beams selected by the network device by using one or more times of beam training processes.

The beam measurement information is beam state information (BSI), and includes a beam index and a reference signal received power (RSRP) of a beam. In addition, a specific beam is not directly indicated in the standard. A transmit beam of a network device is represented by using a reference signal resource index. For example, a beam index 1 is described as a reference signal resource index 1 in the standard. A receive beam on a terminal device side is indicated by using a spatial receive parameter (Spatial Rx parameter) in QCL information, and the beam measurement information (beam state information) is described as an L1-RSRP or L1-SINR related information (L1-RSRP related information) in the standard.

Selection of optimal N beam pairs (beam pair link, BPL). One BPL includes one transmit beam of the network device and one receive beam of a terminal device, or one BPL includes one transmit beam of the terminal device and one receive beam of the network device. As shown in FIG. 4(A) and FIG. 4(B), the terminal device selects a transmit beam of the network device and/or a receive beam of the terminal based on beam sweeping performed by the network device, and the network device selects a transmit beam of the terminal device and/or a receive beam of the network device based on beam sweeping performed by the terminal device. Beam sweeping refers to a process of sending reference signals by using different transmit beams.

Update of a transmit beam. The transmit beam may be a transmit beam of the network device, or may be a transmit beam of the terminal device. When the transmit beam is the transmit beam of the network device, as shown in FIG. 4(E), the network device sends reference signals to the terminal device by using the different transmit beams, and the terminal device receives, by using a same receive beam, the reference signals sent by the network device by using the different transmit beams, determines better transmit beams of the network device based on the received signals, and then sends the better transmit beams of the network device to the network device, so that the network device updates the transmit beams. When the transmit beam is the transmit beam of the terminal device, as shown in FIG. 4(D), the terminal device sends reference signals to the network device by using the different transmit beams, and the network device receives, by using a same receive beam, the reference signals sent by the terminal device by using the different transmit beams, determines the better transmit beams of the terminal device based on the received signals, and then sends the better transmit beams of the terminal device to the terminal device, so that the terminal device updates the transmit beams. A process of determining the better transmit beams based on the received signals may be referred to as beam matching.

Update of a receive beam. The receive beam may be a receive beam of the network device, or may be a receive beam of the terminal device. When the receive beam is the receive beam of the network device, as shown in FIG. 4(F), a terminal device sends a reference signal to a network device by using a same transmit beam, the network device receives, by using different receive beams, the reference signal sent by the terminal device, and determines better receive beams of the network device based on the received signal. Then, the network device updates the receive beams of the network device based on the better receive beams. When the receive beam is the receive beam of the terminal device, as shown in FIG. 4(C), a network device sends a reference signal to a terminal device by using a same transmit beam, and the terminal device receives, by using different receive beams, the reference signal sent by the network device, and determines better receive beams of the terminal device based on the received signal. Then, the terminal device updates the receive beams of the terminal device based on the better receive beams.

During downlink signal transmission, both the transmit beam of the network device and the receive beam of the terminal device may dynamically change. The terminal device may determine a plurality of better receive beams based on a received signal. To enable the terminal device to determine the receive beams of the terminal device, the terminal device may send beam information of a plurality of receive beams to the network device, and the network device may indicate the receive beams of the terminal device to the terminal device by sending beam indication information to the terminal device. When the terminal device uses analog beamforming, the terminal device may precisely determine the receive beams of the terminal device based on the beam indication information sent by the network device. Therefore, beam sweeping time of the terminal device can be reduced, and power is saved.

Figure 5:
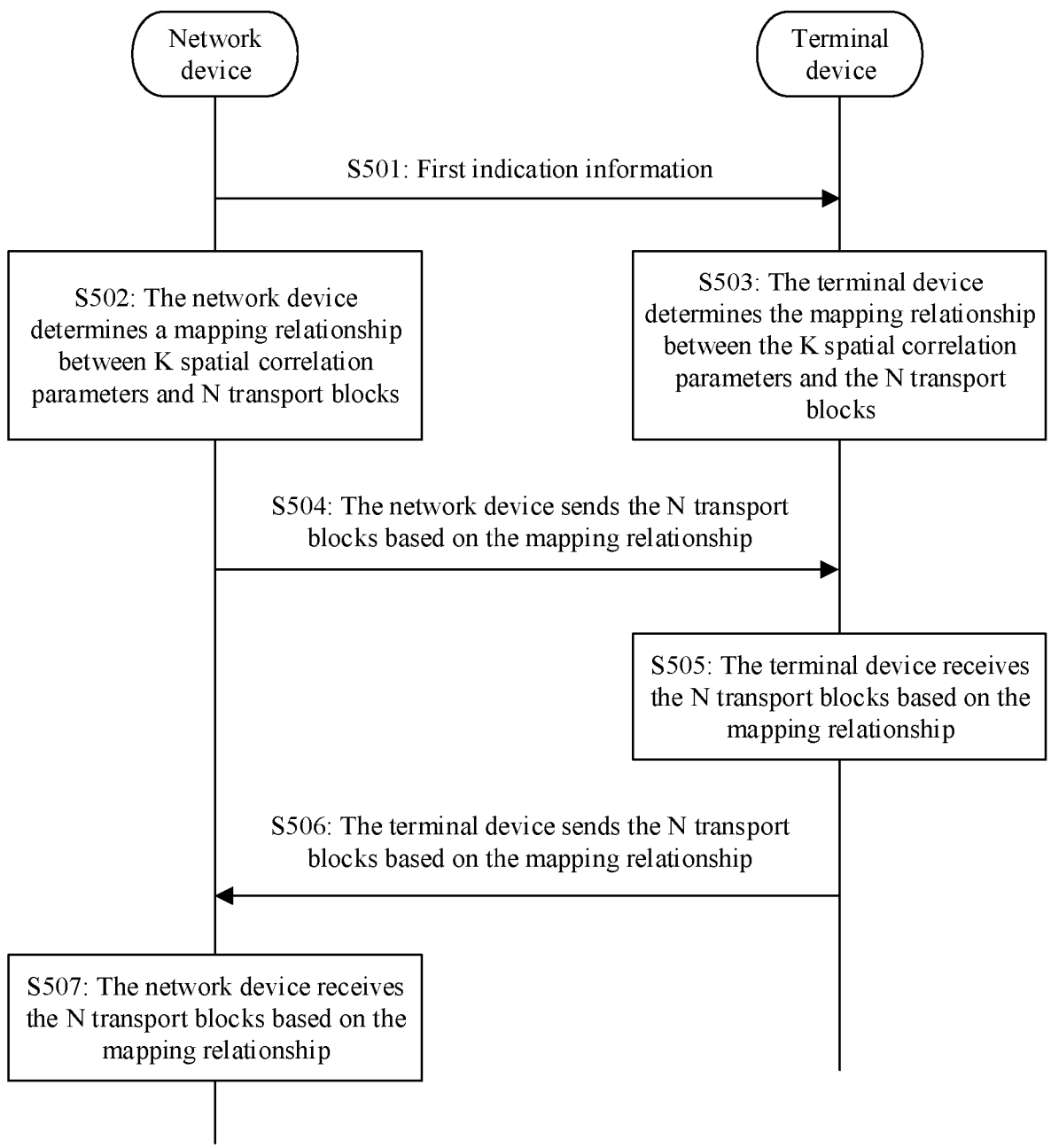
FIG. 5 is a schematic flowchart of a communication method according to an embodiment of this application.

An embodiment of this application provides a communication method. As shown in FIG. 5, the method may include S501 to S505, or the method may include S501 to S503, S506, and S507. S501 to S505 are used by a network device to perform downlink signal/data/channel (for example, PDSCH) transmission with a terminal device. S501 to S503, S506, and S507 are used by the network device to perform uplink signal/data/channel (for example, PUSCH) transmission with the terminal device.

S501: The network device sends first indication information to the terminal device.

Correspondingly, the terminal device receives the first indication information from the network device.

The first indication information is used to indicate K spatial correlation parameters for receiving N transport blocks. For a PDSCH, the spatial correlation parameter refers to the foregoing TCI. For the PUSCH, the spatial correlation parameter refers to the foregoing spatial relation information. In this embodiment of this application, an example in which the spatial correlation parameter is the TCI is used for description, but this is not intended to limit this application.

The N transport blocks are same transport blocks. It may be understood as that one transport block is repeated for N times. Alternatively, it may be understood as that a repetition quantity (repetition number) of configuration of one transport block is N, and so on. This is not limited in this application.

It should be noted that, in the embodiments of this application, the N transport blocks may be replaced with a transport block carried on N resources. The N resources may carry N repetitions of one transport block. The N repetitions of the transport block may be understood as that transport blocks on the N resources are same transport blocks, or may be understood as that a repetition quantity (repetition number) of configuration of one transport block is N, and so on. This is not limited in this application. Alternatively, the N resources may carry one transport block (it may also be understood as that one TB is divided into a plurality of parts that are respectively carried on a plurality of resources). Alternatively, the N resources may carry a plurality of repetitions of a plurality of transport blocks. This is not limited in this application.

In the embodiments of this application, the N transport blocks may be replaced with the N resources. Further, a multiplexing manner of the transport block may be replaced with a multiplexing manner of the resource, and a mapping relationship between spatial correlation parameters and transport blocks may be replaced with a mapping relationship between the spatial correlation parameters and resources. For example, a mapping relationship between the K spatial correlation parameters and the N transport blocks may be replaced with a mapping relationship between the K spatial correlation parameters and the N resources. Further, being used to demodulate the transport block may be replaced with being used to correspond to a transport block on the resource. Further, one of the N transport blocks may be replaced with one of the N resources. It should be understood that, in this case, there is no limitation that the N transport blocks are the same transport blocks.

K and N are integers greater than 1, and K≤N. It should be noted that an example in which K≤N is used for description in this embodiment of this application, but this is not intended to be limited thereto.

Specifically, the first indication information may be transferred by using at least one of second indication information, third indication information, and fourth indication information. The second indication information may be carried by using radio resource control (RRC) signaling, the third indication information may be carried by using media access control-control element (MAC-CE) signaling, and the fourth indication information may be carried by using downlink control information (DCI) signaling.

For example, the first indication information may be jointly indicated by using the second indication information, the third indication information, and the fourth indication information. The second indication information is used to indicate a plurality of candidate spatial correlation parameters, the third indication information is used to indicate a plurality of active spatial correlation parameters in the plurality of candidate spatial correlation parameters, and the fourth indication information is used to indicate the K spatial correlation parameters in the plurality of active spatial correlation parameters.

For example, the first indication information may alternatively be transferred by using one of second indication information, third indication information, or fourth indication information. That is, one of the second indication information, the third indication information, or the fourth indication information may be used to indicate the K spatial correlation parameters.

For example, the first indication information may alternatively be transferred by using the second indication information and the third indication information. The second indication information may be used to indicate a plurality of candidate spatial correlation parameters, and the third indication information may be used to indicate the K spatial correlation parameters in the plurality of candidate spatial correlation parameters.

For example, the first indication information may alternatively be transferred by using the third indication information and the fourth indication information. The third indication information may be used to indicate a plurality of candidate spatial correlation parameters, and the fourth indication information may be used to indicate the K spatial correlation parameters in the plurality of candidate spatial correlation parameters.

For example, the first indication information may alternatively be transferred by using the second indication information and the fourth indication information. The second indication information may be used to indicate a plurality of candidate spatial correlation parameters, and the fourth indication information may be used to indicate the K spatial correlation parameters in the plurality of candidate spatial correlation parameters.

It should be noted that, that the first indication information is used to indicate the K spatial correlation parameters for receiving the N transport blocks may alternatively be understood as that the first indication information is used to indicate the K spatial correlation parameters and the N transport blocks, and the K spatial correlation parameters are used to receive the N transport blocks. That the first indication information is used to indicate the K spatial correlation parameters for receiving the N transport blocks may alternatively be understood as that the first indication information is used to indicate the K spatial correlation parameters, and the K spatial correlation parameters are used to receive the N transport blocks.

S502: The network device determines the mapping relationship between the K spatial correlation parameters and the N transport blocks.

Specifically, the network device may determine the mapping relationship between the K spatial correlation parameters and the N transport blocks based on a multiplexing manner of the N transport blocks.

A multiplexing manner of a transport block may include at least one of space division multiplexing (SDM), time division multiplexing (TDM), and frequency division multiplexing (FMD).

It should be noted that, in this embodiment of this application, to conveniently and clearly describe the mapping relationship between the K spatial correlation parameters and the N transport blocks, the concept of grouping the N transport blocks is introduced. However, this is not intended to limit to performing a grouping action during actual application or in the standard or an execution order of grouping of the N transport blocks and mapping between the N transport blocks and the K spatial correlation parameters during actual application or in the standard. The mapping relationship obtained through the foregoing steps falls within the protection scope of this application, provided that the mapping relationship is the same as the mapping relationship between the K spatial correlation parameters and the N transport blocks.

It should also be noted that sorting of the N transport blocks or sorting of the K spatial correlation parameters mentioned in the embodiments of this application is merely for ease of description. During actual application or in the standard, a sorting action may be performed, or may not be performed. It may be understood that step S502 may be replaced by obtaining, by the network device, the mapping relationship between the K spatial correlation parameters and the N transport blocks. In this case, the mapping relationship in the embodiments of this application may be determined by the network device or a specified module in the network device, or may be obtained by the network device from another network element.

It should be noted that, in this embodiment of this application, "the mapping relationship between the K spatial correlation parameters and the N transport blocks" may also be described as "the mapping relationship between the N transport blocks and the K spatial correlation parameters". That the K spatial correlation parameters arranged in an order A are mapped to the N transport blocks arranged in an order B may alternatively be described as that the N transport blocks arranged in the order B are mapped to the K spatial correlation parameters arranged in the order A. It should be understood that, in this embodiment of this application, for ease of description, sorting of the K spatial correlation parameters and the N transport blocks is not intended to limit performing a sorting action during actual application or in the standard. The mapping relationship obtained through the foregoing steps falls within the protection scope of this application, provided that the mapping relationship is the same as the mapping relationship between the K spatial correlation parameters and the N transport blocks.

The N transport blocks may be grouped based on the multiplexing manner of the N transport blocks, and mapped to the K spatial correlation parameters in a grouping order. Alternatively, the N transport blocks may be first mapped to the K spatial correlation parameters and then grouped.

The mapping relationship between the N transport blocks and the K spatial correlation parameters mainly includes the following.

Optionally, one multiplexing manner is used for the N transport blocks, and the N transport blocks include (are divided into) K groups of transport blocks. In this case, the mapping relationship between the K spatial correlation parameters and the N transport blocks includes: The K spatial correlation parameters arranged in a first order are sequentially mapped to the K groups of transport blocks arranged in an order corresponding to the multiplexing manner.

That is, each spatial correlation parameter corresponds to one group of transport blocks, and the groups are arranged in the order corresponding to the multiplexing manner. Further, the N transport blocks may be divided into the K groups of transport blocks in the order corresponding to the multiplexing manner.

For example, the N transport blocks may be equally divided into the K groups of transport blocks in the order corresponding to the multiplexing manner. It may be understood as that each group of transport blocks in the first (K−1) groups of transport blocks includes ⌈N/K⌉ transport blocks, and the last group of transport blocks includes N−(K−1)*⌈N/K⌉ transport blocks. Alternatively, It may be understood as that an $i^{th}$ group of transport blocks includes $$\left((i-1)^{*\lceil N/K \rceil}+1\right)^{th} \text{ to } \left(i^{*\lceil N/K \rceil}\right)^{th}$$

transport blocks in the N transport blocks, where i is an integer and 1≤i≤K−1, and the last group of transport blocks, namely, a $K^{th}$ group of transport blocks, includes an ((K−1)*⌈N/K⌉+1)$^{th}$ transport block to an $N^{th}$ transport block in the N transport blocks.

It should be noted that, for the N transport blocks whose multiplexing manner is frequency division multiplexing, because transport blocks that are close in frequency domain have more similar channel characteristics, a better transport block combination effect can be obtained by using the foregoing mapping method. In addition, the frequency division multiplexing manner can be used to complete transport block transmission more quickly, and a transmission delay can be reduced. For the N transport blocks that are time division multiplexed, frequent switching of beams or spatial correlation parameters can be reduced by using the foregoing mapping method, and implementation complexity of the terminal device can be reduced.

For example, when the multiplexing manner is the frequency division multiplexing manner, a basis for grouping may include: Transport blocks in one group are consecutive in frequency domain, are QCL-related, are on one subband, are on one CC, or are in one BWP. When the multiplexing manner is the time division multiplexing manner, a basis for grouping may include: Transport blocks in one group are consecutive in time domain, or are in one time unit.

If multiplexing manners, namely, time division multiplexing, and frequency division multiplexing, are used for the N transport blocks, the N transport blocks include M groups of transport blocks. The mapping relationship between the K spatial correlation parameters and the N transport blocks includes: An $i^{th}$ spatial correlation parameter in the K spatial correlation parameters arranged in a first order is mapped to a $(K*j+i)^{th}$ group of transport blocks in the M groups of transport blocks, where i and j are integers, 1≤i≤K, 1≤K*j+i≤M, 0≤j≤⌈M/K⌉−1, and ⌈ ⌉ represents rounding up.

Further, the N transport blocks may be divided into the M groups of transport blocks based on a first multiplexing manner, where M is a positive integer. The M groups of transport blocks are arranged in an order corresponding to a second multiplexing manner. The first multiplexing manner is time division multiplexing, and the second multiplexing manner is frequency division multiplexing. Alternatively, the first multiplexing manner is frequency division multiplexing, and the second multiplexing manner is time division multiplexing.

Alternatively, in other words, if the multiplexing manners, namely, time division multiplexing, and frequency division multiplexing, are used for the N transport blocks, the N transport blocks are divided into the M groups of transport blocks based on the first multiplexing manner. The mapping relationship between the K spatial correlation parameters and the N transport blocks includes: The $i^{th}$ spatial correlation parameter in the K spatial correlation parameters arranged in the first order is mapped to the $(K*j+i)^{th}$ group of transport blocks in the M groups of transport blocks arranged in the order corresponding to the second multiplexing manner, where i and j are integers, 1≤i≤K, 1≤K*j+i≤M, and 0≤j≤⌈M/K⌉−1, and ⌈ ⌉ represents rounding up. The first multiplexing manner is time division multiplexing, and the second multiplexing manner is frequency division multiplexing. Alternatively, the first multiplexing manner is frequency division multiplexing, and the second multiplexing manner is time division multiplexing.

Particularly, in a possible implementation, when the terminal device has a single active antenna panel (panel), the first multiplexing manner is frequency division multiplexing, and the second multiplexing manner is time division multiplexing. When the terminal device has a plurality of active antenna panels, the first multiplexing manner is time division multiplexing, and the second multiplexing manner is frequency division multiplexing. A quantity of active antenna panels of the terminal device may be directly or indirectly indicated by the network device, may be explicitly, implicitly, directly, or indirectly reported by the terminal device, or may be reported by the terminal device based on a capability of the terminal device.

Alternatively, in other words, that the first multiplexing manner is frequency division multiplexing and the second multiplexing manner is time division multiplexing is applicable to a case in which the terminal device has the single active antenna panel (panel). That the first multiplexing manner is time division multiplexing and the second multiplexing manner is frequency division multiplexing is applicable to a case in which the terminal device has the plurality of active antenna panels.

Alternatively, in other words, that the first multiplexing manner is frequency division multiplexing and the second multiplexing manner is time division multiplexing is applicable to a case in which the terminal device has a single antenna panel (panel). Optionally, the single antenna panel is active. That the first multiplexing manner is time division multiplexing and the second multiplexing manner is frequency division multiplexing is applicable to a case in which the terminal device has a plurality of antenna panels. Optionally, the plurality of antenna panels are active.

It should be noted that, that the first multiplexing manner is space division multiplexing and the second multiplexing manner is time division multiplexing or frequency division multiplexing may alternatively be understood as that the K spatial correlation parameters are preferentially mapped to transport blocks that are space division multiplexed. A better space division multiplexing effect can be obtained by using this method.

It should be noted that, that the first multiplexing manner is time division multiplexing and the second multiplexing manner is frequency division multiplexing may alternatively be understood as that the K spatial correlation parameters are preferentially mapped to transport blocks that are time division multiplexed. A better time domain diversity effect can be obtained by using this method.

It should be noted that, that the first multiplexing manner is frequency division multiplexing and the second multiplexing manner is time division multiplexing may alternatively be understood as that the K spatial correlation parameters are preferentially mapped to transport blocks that are frequency division multiplexed. A better frequency domain diversity effect can be obtained by using this method, or frequent beam switching can be avoided by using this method.

Figure 6:
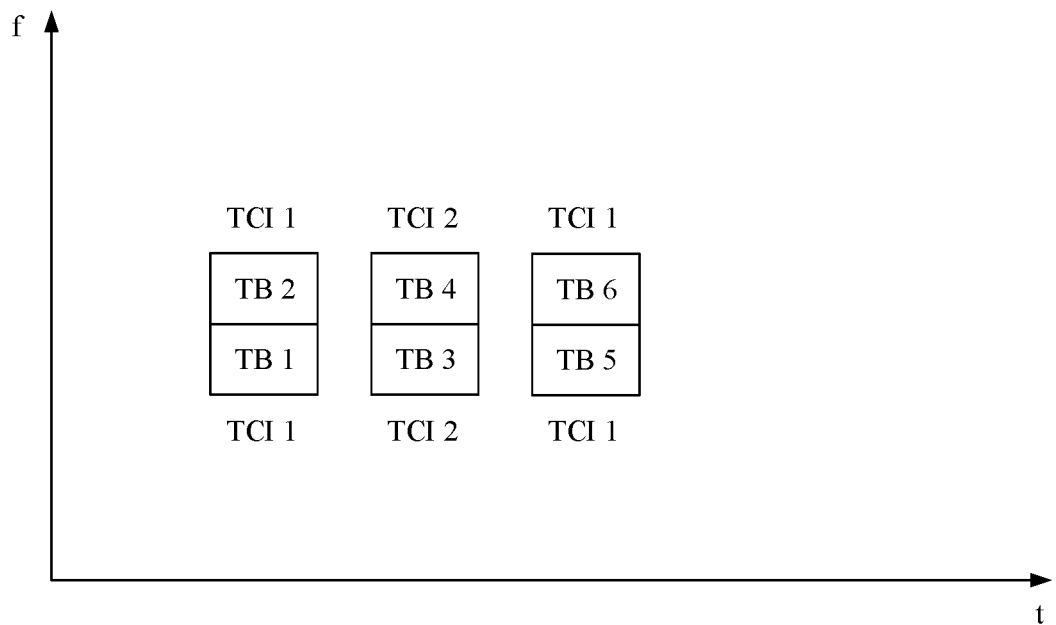
FIG. 6 is a schematic diagram of a mapping relationship between spatial correlation parameters and transport blocks according to an embodiment of this application.

For example, as shown in FIG. 6, it is assumed that K=2, N=6, and M=3. That is, two spatial correlation parameters, namely, a TCI 1 and a TCI 2, are mapped to six same transport blocks, namely, a TB 1 to a TB 6. A first group of transport blocks includes the TB 1 and the TB 2. A second group of transport blocks includes the TB 3 and the TB 4. A third group of transport blocks includes the TB 5 and the TB 6. In this case, the TCI 1 may be mapped to the first group of transport blocks, namely, the TB 1 and the TB 2, the TCI 2 may be mapped to the second group of transport blocks, namely, the TB 3 and the TB 4, and the TCI 1 is then mapped to the third group of transport blocks, namely, the TB 5 and the TB 6. It may be understood that FIG. 6 shows a multiplexing manner in which time division multiplexing is first used and then frequency division multiplexing is used. A multiplexing manner in which frequency division multiplexing is first used and then time division multiplexing is used is also applicable to this embodiment of this application, and is not repeated herein.

Referring to FIG. 6, when a transport block TB is replaced with a resource R (for example, the TB 1 is replaced with R1, and the TB 2 is replaced with R2). For example, it is assumed that K=2, N=6, and M=3. That is, the two spatial correlation parameters, namely, the TCI 1 and the TCI 2, are mapped to six resources R1 to R6. A first group of resources includes R1 and R2. A second group of resources includes R3 and R4. A third group of resources includes R5 and R6. In this case, the TCI 1 may be mapped to the first group of resources R1 and R2, the TCI 2 may be mapped to the second group of resources R3 and R4, and the TCI 1 is then mapped to the third group of resources R5 and R6. It may be understood that FIG. 6 shows a multiplexing manner in which the first multiplexing manner is frequency division multiplexing and the second multiplexing manner is time division multiplexing. A multiplexing manner in which the first multiplexing manner is time division multiplexing and the second multiplexing manner is frequency division multiplexing is also applicable to this embodiment of this application, and is not repeated herein.

In this embodiment of this application, the first order is an ascending order of identifiers of the spatial correlation parameters, a descending order of the identifiers of the spatial correlation parameters, or an order of the K spatial correlation parameters indicated by the first indication information. In this embodiment of this application, the ascending order of the identifiers of the spatial correlation parameters is used as an example for description, but this is not intended to limit this application.

An order corresponding to a multiplexing manner, namely, space division multiplexing, is an ascending order of indexes of demodulation reference signal ports, a descending order of the indexes of the demodulation reference signal ports, an ascending order of indexes of demodulation reference signal port groups, a descending order of the indexes of the demodulation reference signal port groups, an ascending order of indexes of demodulation reference signal code division multiplexing (CDM) groups, a descending order of the indexes of the demodulation reference signal CDM groups, an ascending order of indexes of demodulation reference signal port groups indicated by an antenna port field, a descending order of the indexes of the demodulation reference signal port groups indicated by the antenna port field, an ascending order of indexes of demodulation reference signal ports indicated by the antenna port field, a descending order of the indexes of the demodulation reference signal ports indicated by the antenna port field, an order of the indexes of the demodulation reference signal port groups indicated by the antenna port field, or an order of the indexes of the demodulation reference signal ports indicated by the antenna port field. Each one or more demodulation reference signal ports, demodulation reference signal port groups, and demodulation reference signal CDM groups are used to demodulate one of the N transport blocks. In this embodiment of this application, the ascending order of the indexes of the demodulation reference signal ports is used as an example for description, but this is not intended to limit this application.

It should be understood that the "demodulation reference signal port group" in the embodiments of this application may be the "DMRS CDM group".

For example, a grouping status, predefined in a protocol, of CDM groups 9 (group) of DMRS ports (port) is as follows:

DMRS type (type) 1 (supporting a maximum of eight ports): DMRS ports {0, 1, 4, and 5} belong to a CDM group 0, and DMRS ports {2, 3, 6, and 7} belong to a CDM group 1; and DMRS type 2 (supporting a maximum of 12 ports): DMRS ports {0, 1, 6, and 7} belong to a CDM group 0, DMRS ports {2, 3, 8, and 9} belong to a CDM group 1, and DMRS ports {4, 5, 10, 11} belong to a CDM group 2.

An order corresponding to a multiplexing manner, namely, space division multiplexing, is an ascending order of indexes of demodulation reference signal ports, a descending order of the indexes of the demodulation reference signal ports, an ascending order of indexes of demodulation reference signal port groups, a descending order of the indexes of the demodulation reference signal port groups, an ascending order of indexes of demodulation reference signal port groups indicated by an antenna port field, a descending order of the indexes of the demodulation reference signal port groups indicated by the antenna port field, an ascending order of indexes of demodulation reference signal ports indicated by the antenna port field, a descending order of the indexes of the demodulation reference signal ports indicated by the antenna port field, an order of the indexes of the demodulation reference signal port groups indicated by the antenna port field, or an order of the indexes of the demodulation reference signal ports indicated by the antenna port field. Each one or more demodulation reference signal ports or demodulation reference signal port groups correspond to one of the N resources.

For example, the indexes of the demodulation reference signal ports may be DMRS port indexes. For example, the DMRS port indexes may be 8, 9, and 10. In this case, an ascending order of the DMRS port indexes is 8, 9, and 10, and a descending order of the DMRS port indexes are 10, 9, and 8.

For example, the demodulation reference signal port groups may be DMRS CDM groups. For example, the DMRS CDM groups include a maximum of three identifiers that are 00, 10, and 11. In this case, an ascending order of the indexes of the DMRS CDM groups is 00, 10, and 11, and a descending order of the indexes of the DMRS CDM groups is 11, 10, and 00. For example, the demodulation reference signal port groups may be one or more DMRS CDM groups. For example, the DMRS CDM groups include a maximum of three identifiers that are 00, 10, and 11. In this case, an ascending order of the indexes of the DMRS CDM groups is 00, 10, and 11, and a descending order of the indexes of the DMRS CDM groups is 11, 10, and 00. For example, the N resources include two space division resources (R1 and R2), the K spatial correlation parameters are a TCI 1 and a TCI 2, the space division resource R1 corresponds to all or some ports in a DMRS CDM group 00, and the space division resource R2 corresponds to all or some ports in DMRS CDM groups 01 and 11. In this case, the TCI 1 is mapped to R1, and the TCI 2 is mapped to R2.

An order corresponding to a multiplexing manner, namely, time division multiplexing, is an ascending order of indexes of time domain resources or a descending order of the indexes of the time domain resources, and each time domain resource is used to carry one of the N transport blocks. The indexes of the time domain resources may be symbol indexes, slot indexes, or subframe indexes. Further, the indexes of the time domain resources may be indexes of start locations of the time domain resources carrying transport blocks, or may be indexes of end locations of the time domain resources carrying the transport blocks. This embodiment of this application is described by using the ascending order of the indexes of the time domain resources, but is not intended to be limited thereto.

It should be understood that, in this application, "the indexes of the time domain resources" may alternatively be replaced with "indexes of time units". The indexes of the time domain resources may be indexes of the time domain resources in which the transport blocks are located, or the indexes of the time units may be indexes of time unites in which the transport blocks are located.

It should be further understood that, in this application, the time unit may be one or more radio frames, one or more subframes, one or more slots, one or more mini slots, or one or more orthogonal frequency division multiplexing (OFDM) symbols defined in an LTE system or a 5G NR system, or may be a time window, for example, a system information (SI) window, including a plurality of frames or subframes.

An order corresponding to a multiplexing manner, namely, frequency division multiplexing, is an ascending order of indexes of frequency domain resources or a descending order of the indexes of the frequency domain resources, where each frequency domain resource is used to carry one of the N transport blocks. The indexes of the frequency domain resources may be indexes of resource blocks (RB), indexes of subbands on which transport blocks are located, indexes of component carriers (CC) on which the transport blocks are located, or indexes of bandwidth parts (BWP) in which the transport blocks are located. Further, the indexes of the frequency domain resources may be indexes of start locations of the frequency domain resources carrying the transport blocks, or may be indexes of end locations of the frequency domain resources carrying the transport blocks. This embodiment of this application is described by using the ascending order of the indexes of the frequency domain resources, but is not intended to be limited thereto.

Figure 7:
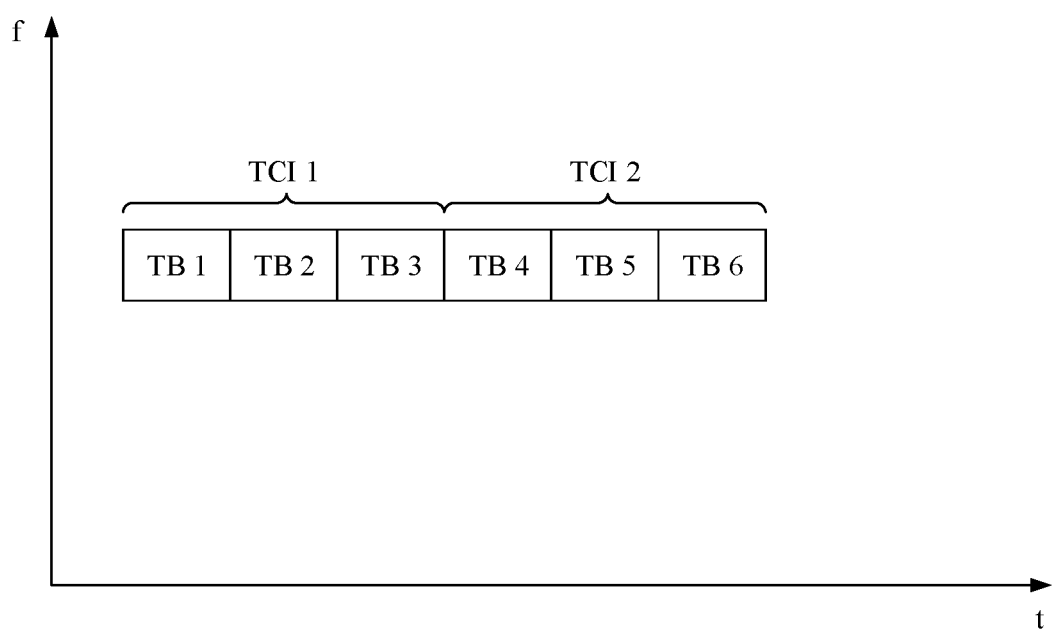
FIG. 7 is a schematic diagram 1 of a mapping relationship between spatial correlation parameters and transport blocks in a case of one multiplexing manner according to an embodiment of this application.
Figure 8:
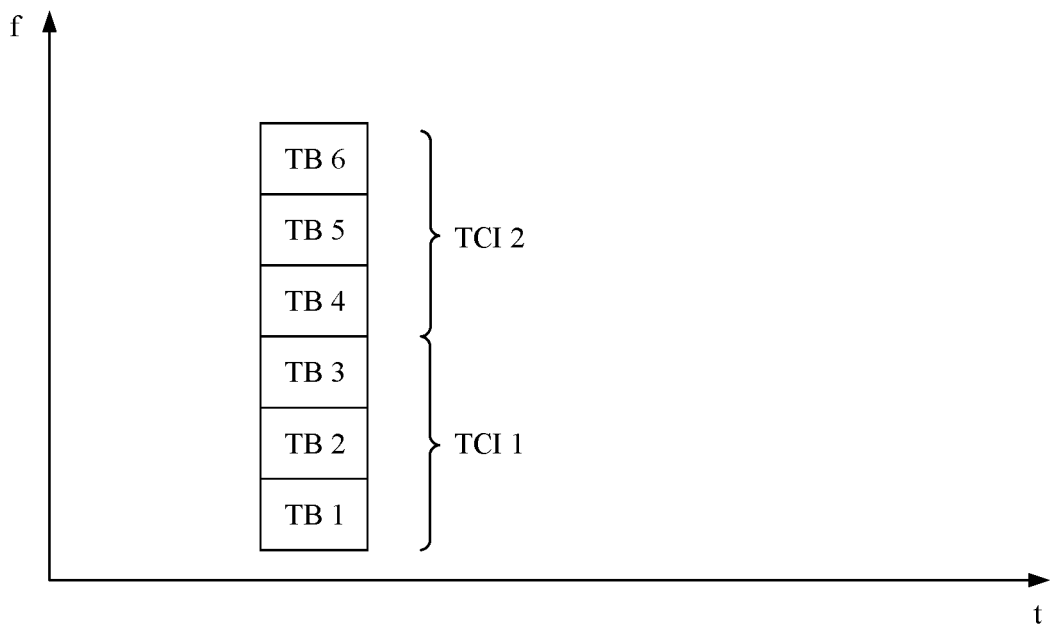
FIG. 8 is a schematic diagram 2 of a mapping relationship between spatial correlation parameters and transport blocks in a case of one multiplexing manner according to an embodiment of this application.
Figure 9:
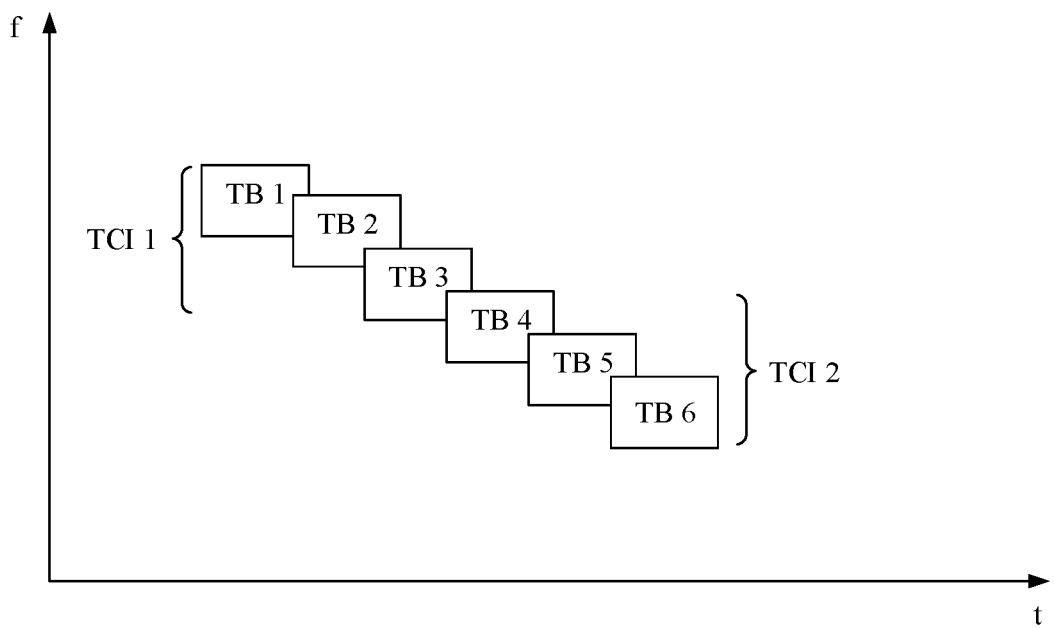
FIG. 9 is a schematic diagram 3 of a mapping relationship between spatial correlation parameters and transport blocks in a case of one multiplexing manner according to an embodiment of this application.

For example, as shown in FIG. 7 to FIG. 9, a multiplexing manner in FIG. 7 is time division multiplexing, a multiplexing manner in FIG. 8 is frequency division multiplexing, and a multiplexing manner in FIG. 9 is space division multiplexing. It is assumed that K=2 and N=6. That is, two spatial correlation parameters, namely, a TCI 1 and a TCI 2, are mapped to six same transport blocks namely, a TB 1 to a TB 6. A first group of transport blocks includes the TB 1 to the TB 3. A second group of transport blocks includes the TB 4 to the TB 6. In this case, the TCI 1 may be mapped to the transport blocks, namely, the TB 1 to the TB 3, and TCI 2 may be mapped to the transport blocks, namely, the TB 4 to the TB 6. The multiplexing manner, namely, time division multiplexing, shown in FIG. 7 can effectively reduce frequent beam switching. Because transport blocks that are close in frequency domain have more similar channel characteristics, the multiplexing manner, namely, frequency division multiplexing, shown in FIG. 8, can achieve a better information combination effect. In addition, the frequency division multiplexing manner can be used to complete transport block transmission more quickly, and a transmission delay can be reduced. The multiplexing manner, namely, space division multiplexing, shown in FIG. 9 can obtain a better space division multiplexing effect.

For example, as shown in FIG. 7 to FIG. 9, the multiplexing manner in FIG. 7 is time division multiplexing, the multiplexing manner in FIG. 8 is frequency division multiplexing, and the multiplexing manner in FIG. 9 is space division multiplexing. It is assumed that a transport block TB is replaced with a resource R. It is assumed that K=2 and N=6. That is, the two spatial correlation parameters, namely, the TCI 1 and the TCI 2, are mapped to six resources R1 to R6. A first group of resources includes R1 to R3. A second group of resources includes R4 to R6. In this case, the TCI 1 may be mapped to the resources R1 to R3, and the TCI 2 may be mapped to the resources R4 to R6. The multiplexing manner, namely, time division multiplexing, shown in FIG. 7 can effectively reduce frequent beam switching. Because resources that are close in frequency domain have more similar channel characteristics, the multiplexing manner, namely, frequency division multiplexing, shown in FIG. 8, can achieve a better information combination effect. In addition, the frequency division multiplexing manner can be used to complete transport block transmission more quickly, and a transmission delay can be reduced. The multiplexing manner, namely, space division multiplexing, shown in FIG. 9 can obtain a better space division multiplexing effect.

It should be noted that, when N cannot be exactly divisible by K, quantities of transport blocks in groups of transport blocks may be different.

Figure 10:
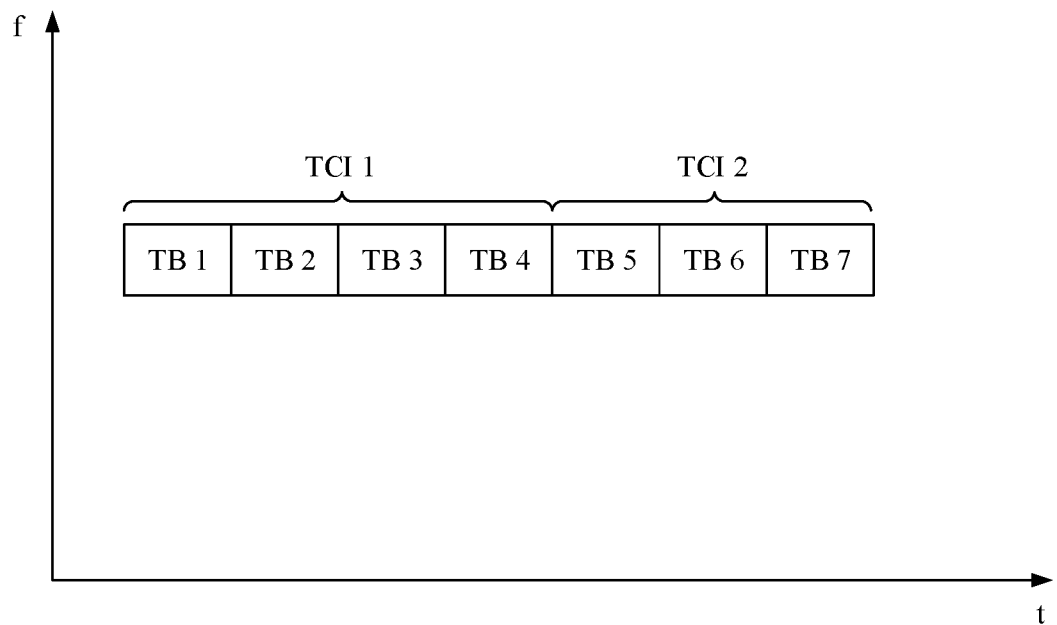
FIG. 10 is a schematic diagram 4 of a mapping relationship between spatial correlation parameters and transport blocks in a case of one multiplexing manner according to an embodiment of this application.

For example, as shown in FIG. 10, an example in which a multiplexing manner is time division multiplexing is used for description. It is assumed that K=2 and N=7. That is, two spatial correlation parameters, namely, a TCI 1 and a TCI 2, are mapped to seven same transport blocks, namely, a TB 1 to a TB 7. A first group of transport blocks includes the TB 1 to the TB 4. A second group of transport blocks includes the TB 5 to the TB 7. In this case, the TCI 1 may be mapped to the transport blocks, namely, the TB 1 to the TB 4, and the TCI 2 may be mapped to the transport blocks, namely, the TB 5 to the TB 7. For example, as shown in FIG. 10, an example in which the multiplexing manner is time division multiplexing is used for description. A transport block TB is replaced with a resource R. It is assumed that K=2 and N=7. That is, the two spatial correlation parameters, namely, the TCI 1 and the TCI 2, are mapped to seven resources R1 to R7. A first group of resources includes R1 to R4. A second group of resources includes R5 to R7. In this case, the TCI 1 may be mapped to the resources R1 to R4, and the TCI 2 may be mapped to the resources R5 to R7.

When the N transport blocks are first mapped to the K spatial correlation parameters and then grouped, for a basis of grouping, refer to the foregoing description. Details are not repeated herein again.

Optionally, the mapping relationship between the K spatial correlation parameters and the N transport blocks includes: The K spatial correlation parameters arranged in a first order are sequentially mapped to the N transport blocks. In other words, the K spatial correlation parameters arranged in the first order are cyclically and sequentially mapped to the N transport blocks. In other words, an $i^{th}$ spatial correlation parameter in the K spatial correlation parameters arranged in the first order is mapped to a $(K*j+i)^{th}$ transport block in the N transport blocks, where i and j are integers, $1 \le i \le K$, $1 \le K*j+i \le N$, $0 \le j \le \lceil N/K \rceil - 1$, and $\lceil \ \rceil$ represents rounding up.

It should be noted that, when $K \le N$, one spatial correlation parameter may be mapped to a plurality of transport blocks, so that it can be ensured that each transport block has a corresponding spatial correlation parameter.

Further, if one multiplexing manner is used for the N transport blocks, the N transport blocks are arranged in an order corresponding to the multiplexing manner.

Figure 11:
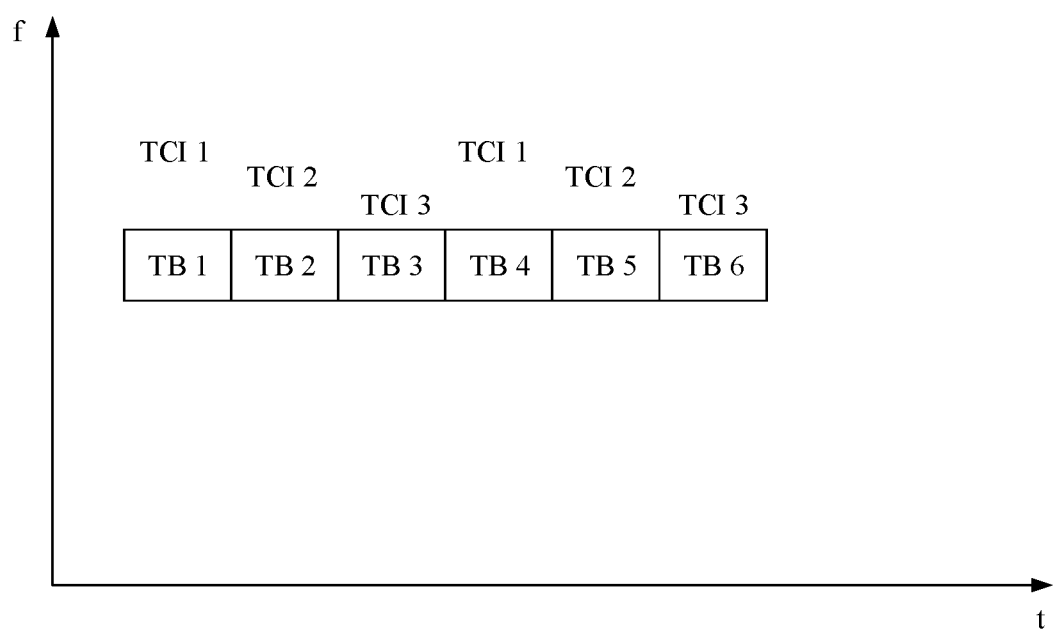
FIG. 11 is a schematic diagram 5 of a mapping relationship between spatial correlation parameters and transport blocks in a case of one multiplexing manner according to an embodiment of this application.
Figure 12:
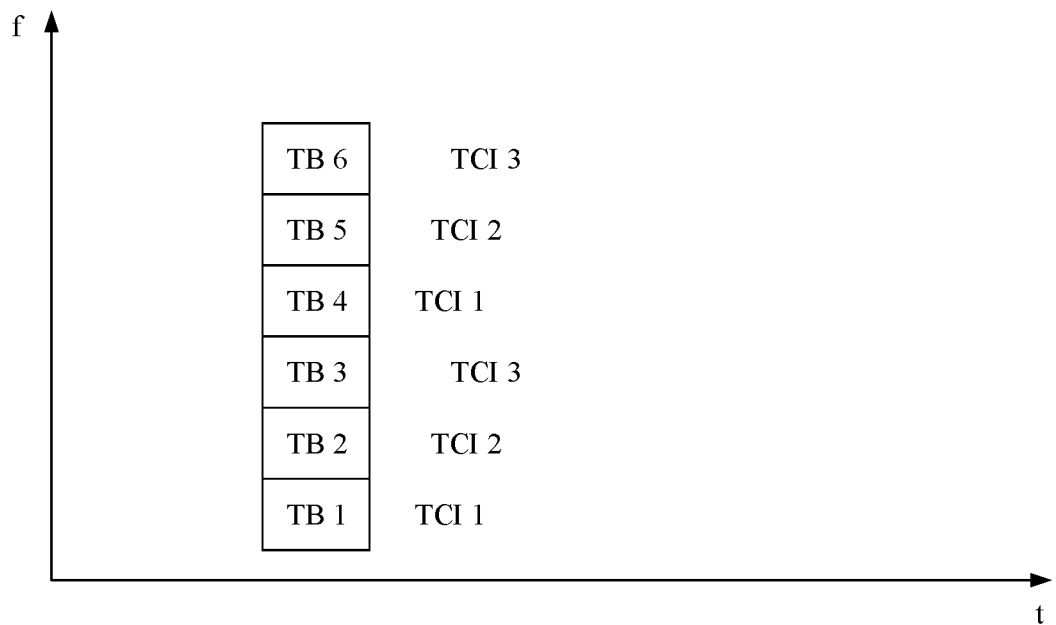
FIG. 12 is a schematic diagram 6 of a mapping relationship between spatial correlation parameters and transport blocks in a case of one multiplexing manner according to an embodiment of this application.
Figure 13:
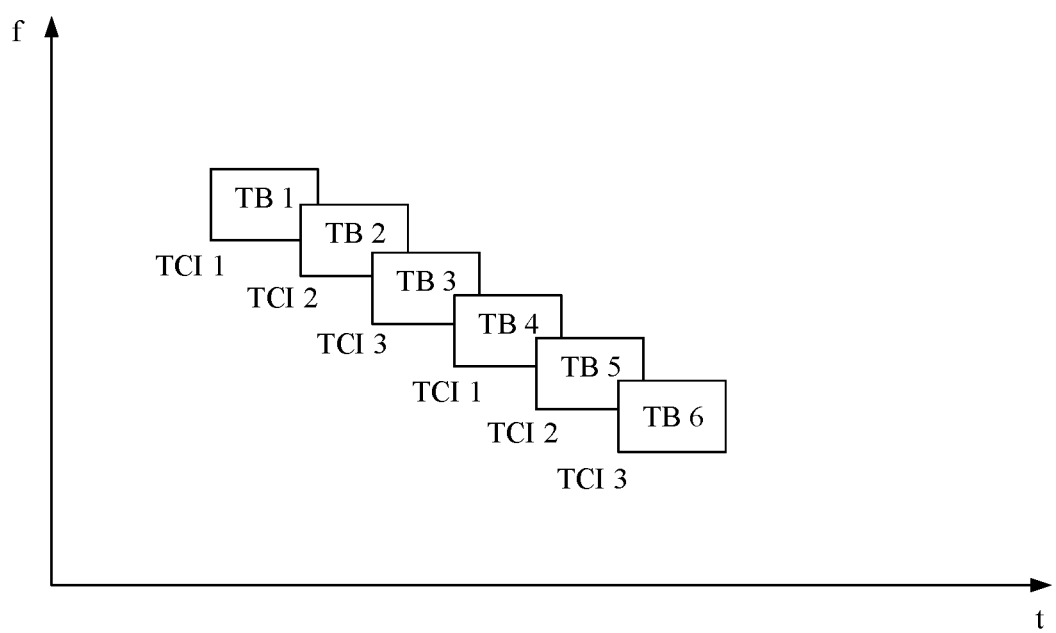
FIG. 13 is a schematic diagram 7 of a mapping relationship between spatial correlation parameters and transport blocks in a case of one multiplexing manner according to an embodiment of this application.

For example, as shown in FIG. 11 to FIG. 13, a multiplexing manner in FIG. 11 is time division multiplexing, a multiplexing manner in FIG. 12 is frequency division multiplexing, and a multiplexing manner in FIG. 13 is space division multiplexing. It is assumed that K=3 and N=6. That is, three spatial correlation parameters, namely, a TCI 1 to a TCI 3, are mapped to six same transport blocks, namely, a TB 1 to a TB 6. In this case, the TCI 1 may be mapped to the TB 1 and the TB 4, the TCI 2 is mapped to the TB 2 and the TB 5, and the TCI 3 is mapped to the TB 3 and the TB 6. The multiplexing manner, namely, time division multiplexing, shown in FIG. 11 can obtain a diversity gain. The multiplexing manner, namely, frequency division multiplexing, shown in FIG. 12 can obtain a frequency domain diversity gain, especially when a spacing, in frequency domain, between a plurality of transport blocks that are frequency division multiplexed is greater than a preset threshold. The multiplexing manner, namely, space division multiplexing, shown in FIG. 13, can complete transport block transmission more quickly, and can further improve system performance.

For example, as shown in FIG. 11 to FIG. 13, the multiplexing manner in FIG. 11 is time division multiplexing, the multiplexing manner in FIG. 12 is frequency division multiplexing, and the multiplexing manner in FIG. 13 is space division multiplexing. A transport block TB is replaced with a resource R. Assuming that K=3 and N=6. That is, the three spatial correlation parameters, namely, the TCI 1 to the TCI 3, are mapped to six resources R1 to R6. In this case, the TCI 1 may be mapped to R1 and R4, the TCI 2 is mapped to R2 and R5, and the TCI 3 is mapped to R3 and R6. The multiplexing manner, namely, time division multiplexing, shown in FIG. 11 can obtain a diversity gain. The multiplexing manner, namely, frequency division multiplexing, shown in FIG. 12 can obtain a frequency domain diversity gain, especially when a spacing, in frequency domain, between a plurality of resources that are frequency division multiplexed is greater than a preset threshold. The multiplexing manner, namely, space division multiplexing, shown in FIG. 13, can complete resource transmission more quickly, and can further improve system performance.

It should be noted that, when N cannot be exactly divisible by K, quantities of resources to which all spatial correlation parameters are mapped may be different.

Figure 14:
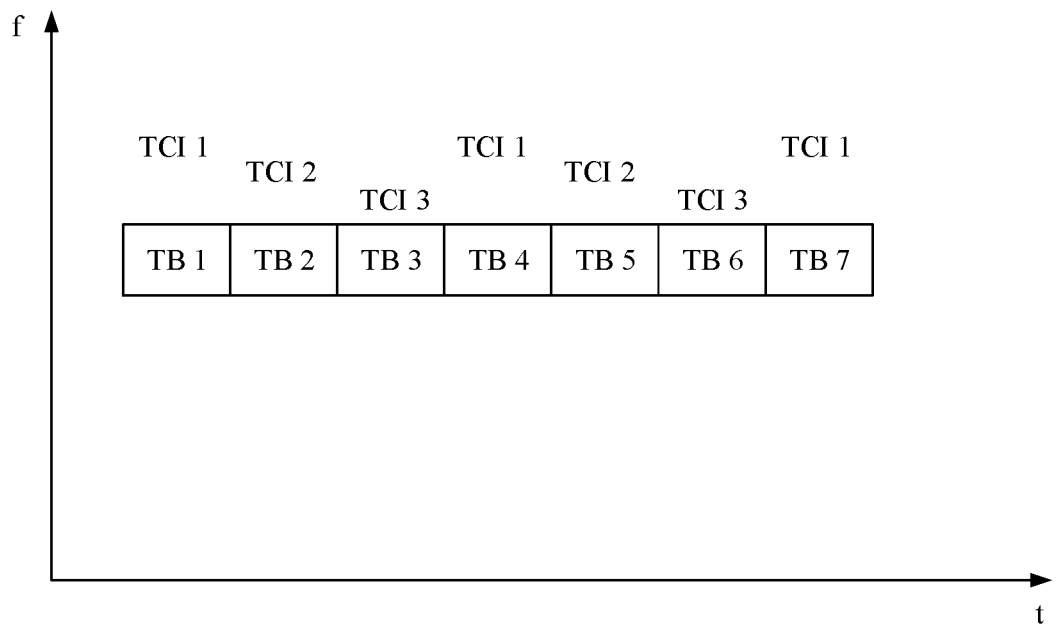
FIG. 14 is a schematic diagram 8 of a mapping relationship between spatial correlation parameters and transport blocks in a case of one multiplexing manner according to an embodiment of this application.

For example, as shown in FIG. 14, an example in which a multiplexing manner is time division multiplexing is used for description. It is assumed that K=3 and N=7. That is, three spatial correlation parameters, namely, a TCI 1 to a TCI 3, are mapped to seven same transport blocks, namely, a TB 1 to a TB 7. In this case, the TCI 1 may be mapped to the TB 1, the TCI 2 is mapped to the TB 2, the TCI 3 is mapped to the TB 3, the TCI 1 then is mapped to the TB 4, and so on. Finally, the TCI 1 may be mapped to the TB 1, the TB 4, and the TB 7, the TCI 2 may be mapped to the TB 2 and the TB 5, and the TCI 3 may be mapped to the TB 3 and the TB 6.

For example, as shown in FIG. 14, an example in which the multiplexing manner is time division multiplexing is used for description. A resource block TB is replaced with a resource R. It is assumed that K=3 and N=7. That is, the three spatial correlation parameters, namely, the TCI 1 to the TCI 3, are mapped to seven resources R1 to R7. In this case, the TCI 1 may be mapped to R1, the TCI 2 is mapped to R2, the TCI 3 is mapped to R4, the TCI 1 is then mapped to R5, and so on. Finally, the TCI 1 may be mapped to R1, R4, and R7, the TCI 2 may be mapped to R2 and R5, and the TCI 3 may be mapped to R3 and R6.

If at least two multiplexing manners are used for the N transport blocks, the at least two multiplexing manners include a first multiplexing manner, the N transport blocks include M groups of transport blocks, M is a positive integer, and transport blocks in each group of transport blocks are arranged in an order corresponding to the first multiplexing manner.

Alternatively, in other words, the at least two multiplexing manners are used for the N transport blocks, the at least two multiplexing manners include the first multiplexing manner, and the K spatial correlation parameters arranged in a first order are preferentially and sequentially mapped to the transport blocks that are arranged in the order corresponding to the first multiplexing manner and that are in each group of transport blocks, and then are mapped to the groups of transport blocks. Further, the K spatial correlation parameters arranged in the first order are preferentially and sequentially mapped to the transport blocks that are arranged in the order corresponding to the first multiplexing manner and that are in each group of transport blocks, and then are repeatedly mapped to the groups of transport blocks.

Alternatively, in other words, the at least two multiplexing manners are used for the N transport blocks, the at least two multiplexing manners include the first multiplexing manner, the N transport blocks are divided into the M groups of transport blocks based on the first multiplexing manner, M is a positive integer, and the transport blocks in each group of transport blocks are arranged in the order corresponding to the first multiplexing manner.

Alternatively, in other words, the at least two multiplexing manners are used for the N transport blocks, the at least two multiplexing manners include the first multiplexing manner, the N transport blocks are divided into the M groups of transport blocks based on the first multiplexing manner, M is a positive integer, each group of transport blocks in the M groups of transport blocks includes at least two transport blocks, the at least two transport blocks are transport blocks multiplexed in the first multiplexing manner, and the at least two transport blocks are arranged in the order corresponding to the first multiplexing manner.

Alternatively, in other words, the at least two multiplexing manners are used for the N transport blocks, the at least two multiplexing manners include the first multiplexing manner, the N transport blocks include the M groups of transport blocks, M is a positive integer, at least one group of transport blocks in the M groups of transport blocks is multiplexed in the first multiplexing manner and arranged in the order corresponding to the first multiplexing manner.

Further, if two multiplexing manners are used for the N transport blocks, the M groups of transport blocks are arranged in an order corresponding to a second multiplexing manner.

The first multiplexing manner is space division multiplexing, and the second multiplexing manner is time division multiplexing or frequency division multiplexing; the first multiplexing manner is time division multiplexing, and the second multiplexing manner is frequency division multiplexing; or the first multiplexing manner is frequency division multiplexing, and the second multiplexing manner is time division multiplexing.

Particularly, in a possible implementation, when the terminal device has a single active antenna panel, the first multiplexing manner is time division multiplexing, and the second multiplexing manner is frequency division multiplexing. When the terminal device has a plurality of active antenna panels, the first multiplexing manner is frequency division multiplexing, and the second multiplexing manner is time division multiplexing. A quantity of active antenna panels of the terminal device may be directly or indirectly indicated by the network device, may be explicitly, implicitly, directly, or indirectly reported by the terminal device, or may be reported by the terminal device based on a capability of the terminal device.

Alternatively, in other words, that the first multiplexing manner is time division multiplexing and the second multiplexing manner is frequency division multiplexing is applicable to a case in which the terminal device has the single active antenna panel. That the first multiplexing manner is frequency division multiplexing and the second multiplexing manner is time division multiplexing is applicable to a case in which the terminal device has the plurality of active antenna panels.

Alternatively, in other words, that the first multiplexing manner is time division multiplexing and the second multiplexing manner is frequency division multiplexing is applicable to a case in which the terminal device has a single antenna panel. Optionally, the single antenna panel is active. That the first multiplexing manner is frequency division multiplexing and the second multiplexing manner is time division multiplexing is applicable to a case in which the terminal device has a plurality of antenna panels. Optionally, the plurality of antenna panels are active.

It should be noted that, that the first multiplexing manner is space division multiplexing and the second multiplexing manner is time division multiplexing or frequency division multiplexing may alternatively be understood as that the K spatial correlation parameters are preferentially mapped to transport blocks that are space division multiplexed. A better space division multiplexing effect can be obtained by using this method.

It should be noted that, that the first multiplexing manner is time division multiplexing and the second multiplexing manner is frequency division multiplexing may alternatively be understood as that the K spatial correlation parameters are preferentially mapped to transport blocks that are time division multiplexed. A better time domain diversity effect can be obtained by using this method.

It should be noted that, that the first multiplexing manner is frequency division multiplexing and the second multiplexing manner is time division multiplexing may alternatively be understood as that the K spatial correlation parameters are preferentially mapped to transport blocks that are frequency division multiplexed. A better frequency domain diversity effect can be obtained by using this method, or frequent beam switching can be avoided by using this method.

Figure 15:
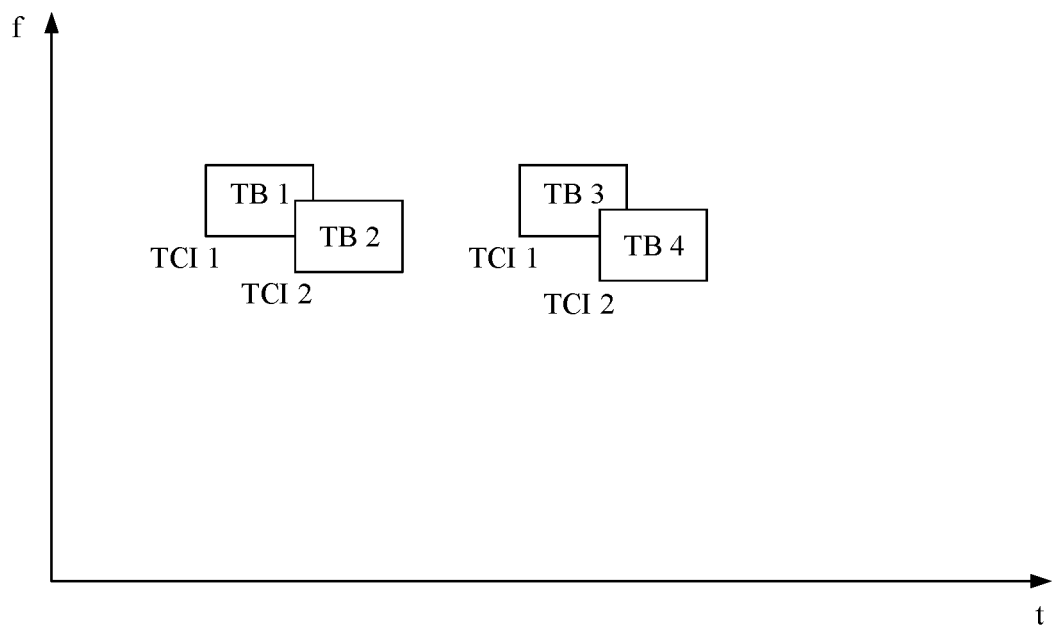
FIG. 15 is a schematic diagram 1 of a mapping relationship between spatial correlation parameters and transport blocks in a case of two multiplexing manners according to an embodiment of this application.
Figure 16:
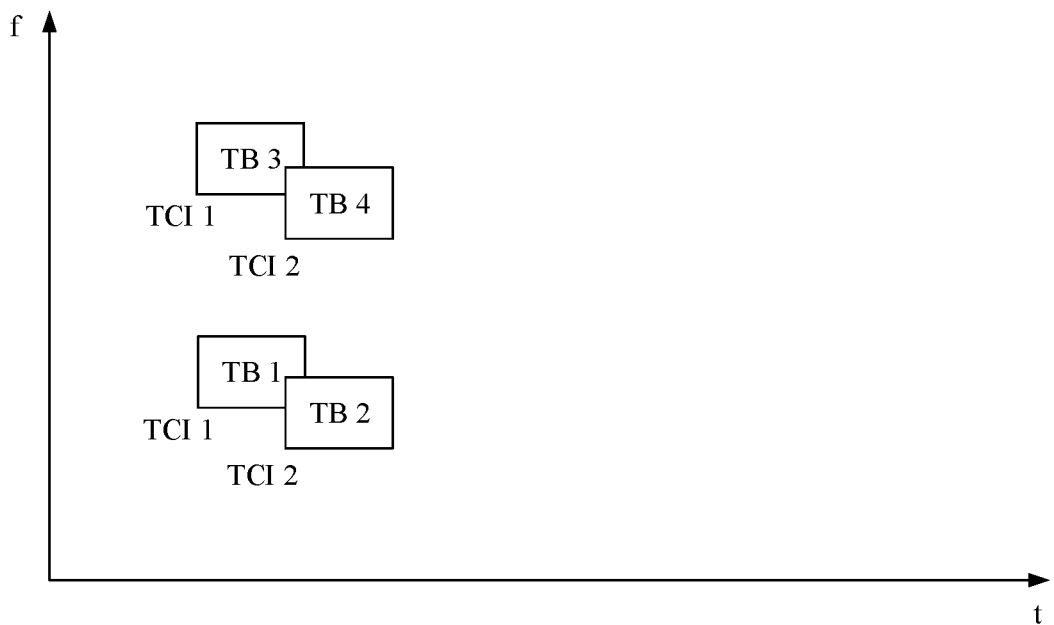
FIG. 16 is a schematic diagram 2 of a mapping relationship between spatial correlation parameters and transport blocks in a case of two multiplexing manners according to an embodiment of this application.
Figure 17A:
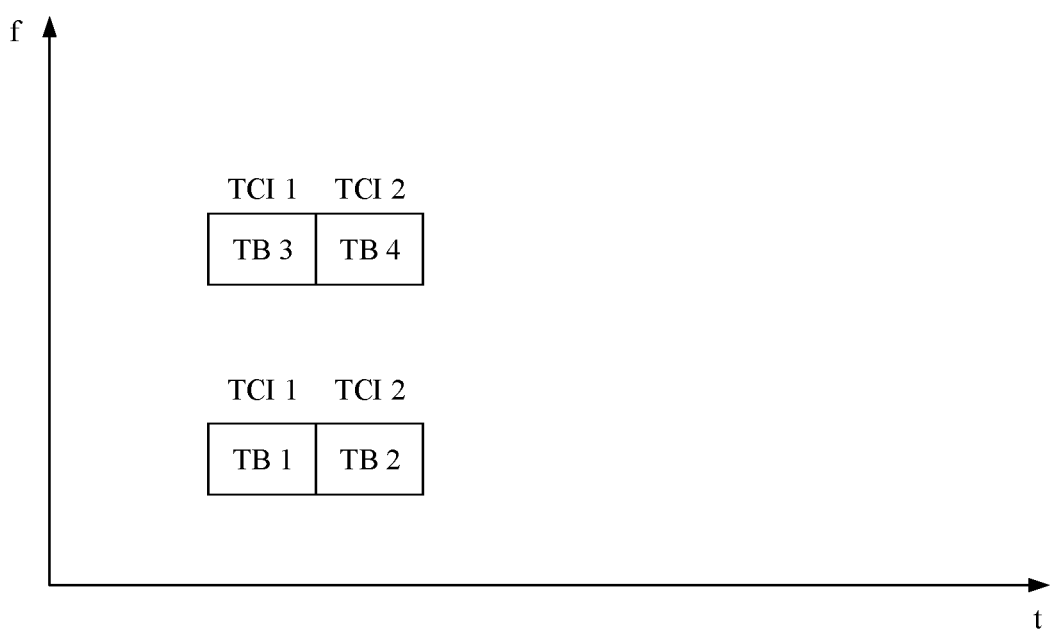
FIG. 17A is a schematic diagram 3 of a mapping relationship between spatial correlation parameters and transport blocks in a case of two multiplexing manners according to an embodiment of this application.
Figure 18:
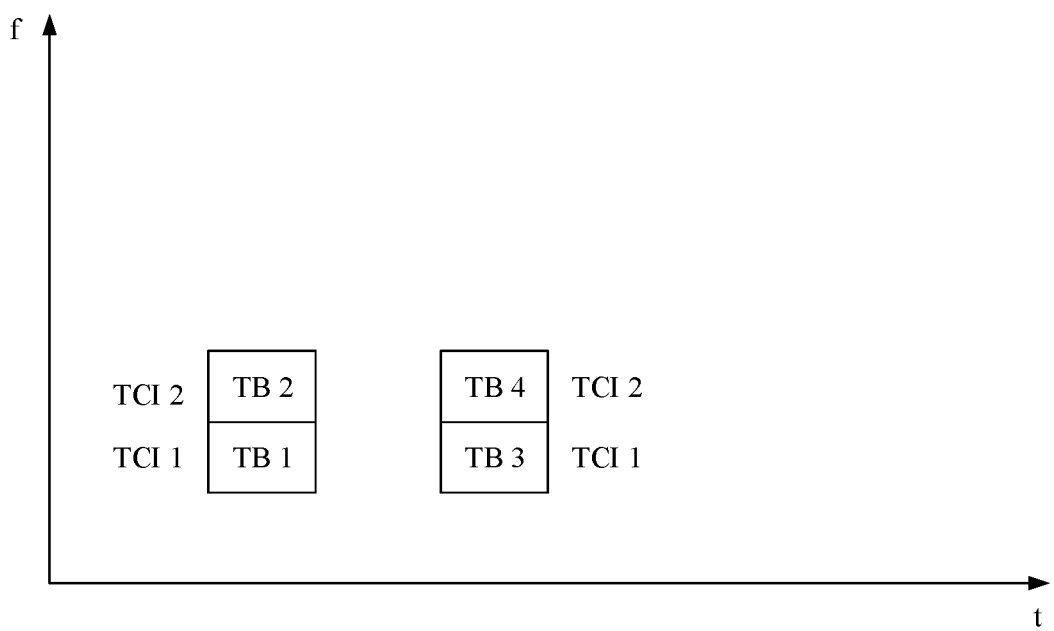
FIG. 18 is a schematic diagram 5 of a mapping relationship between spatial correlation parameters and transport blocks in a case of two multiplexing manners according to an embodiment of this application.

For example, as shown in FIG. 15 and FIG. 16, in FIG. 15, a first multiplexing manner is space division multiplexing, a second multiplexing manner is time division multiplexing, transport blocks in each group of transport blocks are arranged in an order corresponding to the multiplexing manner, namely, space division multiplexing, and M groups of transport blocks are arranged in an order corresponding to the multiplexing manner, namely, time division multiplexing. In FIG. 16, a first multiplexing manner is space division multiplexing, a second multiplexing manner is frequency division multiplexing, transport blocks in each group of transport blocks are arranged in an order corresponding to the multiplexing manner, namely, space division multiplexing, and M groups of transport blocks are arranged in an order corresponding to the multiplexing manner, namely, frequency division multiplexing. It is assumed that K=2, N=4, and M=2. That is, two spatial correlation parameters, namely, a TCI 1 and a TCI 2, are mapped to four same transport blocks, namely, a TB 1 to a TB 4. In this case, a first group of transport blocks includes the TB 1 and the TB 2, and a second group of transport blocks includes the TB 3 and the TB 4. In addition, the TB 1 and the TB 2 are space division multiplexed, the TB 3 and the TB 4 are space division multiplexed, and the first group of transport blocks and the second group of transport blocks are time division multiplexed. In FIG. 17A and FIG. 18, the TCI 1 may be mapped to the TB 1 and the TB 3, and the TCI 2 may be mapped to the TB 2 and the TB 4. When the first multiplexing manner is space division multiplexing, a better space division multiplexing effect can be obtained. That is, preferentially mapping the K spatial correlation parameters to transport blocks that are space division multiplexed can obtain the better space division multiplexing effect.

For example, as shown in FIG. 15 and FIG. 16, in FIG. 15, the first multiplexing manner is space division multiplexing, the second multiplexing manner is time division multiplexing, a transport block TB is replaced with a resource R, and resources in each group of resources are arranged in the order corresponding to the multiplexing manner, namely, space division multiplexing, and M groups of resources are arranged in an order corresponding to the multiplexing manner, namely, time division multiplexing. In FIG. 16, the first multiplexing manner is space division multiplexing, the second multiplexing manner is frequency division multiplexing, resources in each group of resources are arranged in the order corresponding to the multiplexing manner, namely, space division multiplexing, and M groups of resources are arranged in the order corresponding to the multiplexing manner, namely, frequency division multiplexing. It is assumed that K=2, N=4, and M=2. That is, the two spatial correlation parameters, namely, the TCI 1 and the TCI 2, are mapped to four resources R1 to R4. In this case, a first group of resources includes R1 and R2, and a second group of resources includes R3 and R4. In addition, R1 and R2 are space division multiplexed (for example, R1 corresponds to a DMRS port 0, and R2 corresponds to a DMRS port 2; for another example, R1 corresponds to all or some DMRS ports in a DMRS CDM group 0, and R2 corresponds to all or some DMRS ports in DMRS CDM groups 10 and 11), R3 and R4 are space division multiplexed (for example, R3 corresponds to a DMRS port 0, and R4 corresponds to a DMRS port 2; for another example, R3 corresponds to all or some DMRS ports in a DMRS CDM group 0, and R4 corresponds to all or some DMRS ports in DMRS CDM groups 10 and 11), and the first group of resources and the second group of resources are frequency division multiplexed. The TCI 1 may be mapped to R1 and R3, and the TCI 2 may be mapped to R2 and R4. When the first multiplexing manner is space division multiplexing, a better space division multiplexing effect can be obtained. That is, preferentially mapping the K spatial correlation parameters to resources that are space division multiplexed can obtain the better space division multiplexing effect.

Figure 17B:
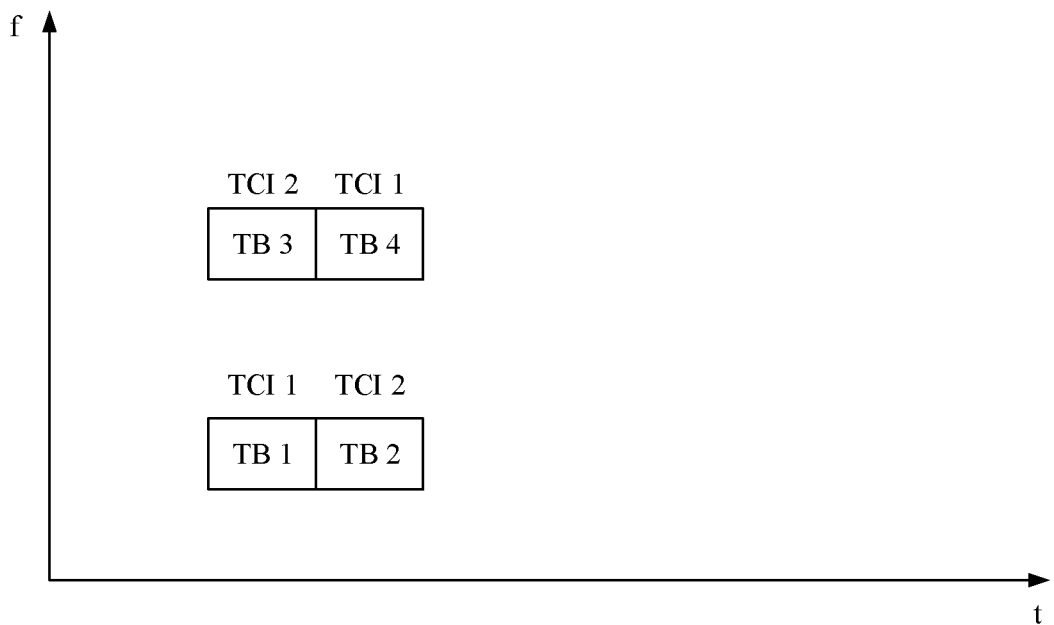
FIG. 17B is a schematic diagram 4 of a mapping relationship between spatial correlation parameters and transport blocks in a case of two multiplexing manners according to an embodiment of this application.

For example, as shown in FIG. 17A, FIG. 17B, and FIG. 18, in FIG. 17A and FIG. 17B, a first multiplexing manner is time division multiplexing, a second multiplexing manner is frequency division multiplexing, transport blocks in each group of transport blocks are arranged in an order corresponding to the multiplexing manner, namely, time division multiplexing, and M groups of transport blocks are arranged in an order corresponding to the multiplexing manner, namely, frequency division multiplexing. In FIG. 18, a first multiplexing manner is frequency division multiplexing, a second multiplexing manner is time division multiplexing, transport blocks in each group of transport blocks are arranged in an order corresponding to the multiplexing manner, namely, frequency division multiplexing, and M groups of transport blocks are arranged in an order corresponding to the multiplexing manner, namely, time division multiplexing. It is assumed that K=2, N=4, and M=2. That is, two spatial correlation parameters, namely, a TCI 1 and a TCI 2, are mapped to four same transport blocks, namely, a TB 1 to a TB 4. In this case, a first group of transport blocks includes the TB 1 and the TB 2, and a second group of transport blocks includes the TB 3 and the TB 4. In FIG. 17A and FIG. 17B, the TB 1 and the TB 2 are time division multiplexed, the TB 3 and the TB 4 are time division multiplexed, and the first group of transport blocks and the second group of transport blocks are frequency division multiplexed. In FIG. 18, the TB 1 and the TB 2 are frequency division multiplexed, the TB 3 and the TB 4 are frequency division multiplexed, and the first group of transport blocks and the second group of transport blocks are time division multiplexed. The TCI 1 may be mapped to the TB 1 and the TB 3, and the TCI 2 may be mapped to the TB 2 and the TB 4. Compared with the transmission manner in which only time division multiplexing is used in FIG. 7, the transmission manners shown in FIG. 17A, FIG. 17B, and FIG. 18 can effectively reduce a decoding delay.

For example, as shown in FIG. 17A, FIG. 17B, and FIG. 18, in FIG. 17A and FIG. 17B, the first multiplexing manner is time division multiplexing, the second multiplexing manner is frequency division multiplexing, a transport block TB is replaced with a resource R, and resources in each group of resources are arranged in the order corresponding to the multiplexing manner, namely, time division multiplexing, and M groups of resources are arranged in the order corresponding to the multiplexing manner, namely, frequency division multiplexing. In FIG. 18, the first multiplexing manner is frequency division multiplexing, the second multiplexing manner is time division multiplexing, resources in each group of resources are arranged in the order corresponding to the multiplexing manner, namely, frequency division multiplexing, and M groups of resources are arranged in the order corresponding to the multiplexing manner, namely, time division multiplexing. It is assumed that K=2, N=4, and M=2. That is, the two spatial correlation parameters, namely, the TCI 1 and the TCI 2, are mapped to four resources R1 to R4. In this case, a first group of resources includes R1 and R2, and a second group of resources includes R3 and R4. In FIG. 17A and FIG. 17B, R1 and R2 are time division multiplexed, R3 and R4 are time division multiplexed, and the first group of resources and the second group of resources are frequency division multiplexed. In FIGS. 18, R1 and R2 are frequency division multiplexed, R3 and R4 are frequency division multiplexed, and the first group of resources and the second group of resources are time division multiplexed. The spatial correlation parameters may be mapped to the resources in a fixed order. As shown in FIG. 17A and FIG. 18, the TCI 1 may be mapped to R1 and R3, and the TCI 2 may be mapped to R2 and R4. Alternatively, the spatial correlation parameters may be mapped to the resources in reverse orders, to be specific, the first two Rs use the first order and the following two Rs use an order reverse to the first order. As shown in FIG. 17B, the TCI 1 may be mapped to R1 and R4, and the TCI 2 may be mapped to R2 and R3. Compared with the transmission manner in which only time division multiplexing is used in FIG. 7, the transmission manners shown in FIG. 17A, FIG. 17B, and FIG. 18 can effectively reduce a decoding delay. Compared with the transmission manner shown in FIG. 17A, the transmission manner shown in FIG. 17B can obtain better robustness. For example, one TB is separately transmitted by two transmission points (TRP). A TRP 1 transmits information on the resources R1 and R4, and a TRP 2 transmits information on the resources R2 and R4, so that a frequency hopping gain can be obtained.

If three multiplexing manners are used for the N transport blocks, the groups of transport blocks are first arranged in an order corresponding to a second multiplexing manner, and then arranged in an order corresponding to a third multiplexing manner.

The first multiplexing manner is space division multiplexing, the second multiplexing manner is time division multiplexing, and the third multiplexing manner is frequency division multiplexing; or the first multiplexing manner is space division multiplexing, the second multiplexing manner is frequency division multiplexing, and the third multiplexing manner is time division multiplexing.

Particularly, in a possible implementation, when the terminal device has a single active antenna panel, the second multiplexing manner is time division multiplexing, and the third multiplexing manner is frequency division multiplexing. When the terminal device has a plurality of active antenna panels, the second multiplexing manner is frequency division multiplexing, and the third multiplexing manner is time division multiplexing. A quantity of active antenna panels of the terminal device may be directly or indirectly indicated by the network device, may be explicitly, implicitly, directly, or indirectly reported by the terminal device, or may be reported by the terminal device based on a capability of the terminal device.

Alternatively, in other words, that the second multiplexing manner is time division multiplexing and the third multiplexing manner is frequency division multiplexing is applicable to a case in which the terminal device has the single active antenna panel. That the second multiplexing manner is frequency division multiplexing and the third multiplexing manner is time division multiplexing is applicable to a case in which the terminal device has the plurality of active antenna panels.

Alternatively, in other words, that the second multiplexing manner is time division multiplexing and the third multiplexing manner is frequency division multiplexing is applicable to a case in which the terminal device has a single antenna panel. Optionally, the single antenna panel is active. That the second multiplexing manner is frequency division multiplexing and the third multiplexing manner is time division multiplexing is applicable to a case in which the terminal device has a plurality of antenna panels. Optionally, the plurality of antenna panels are active.

Figure 19:
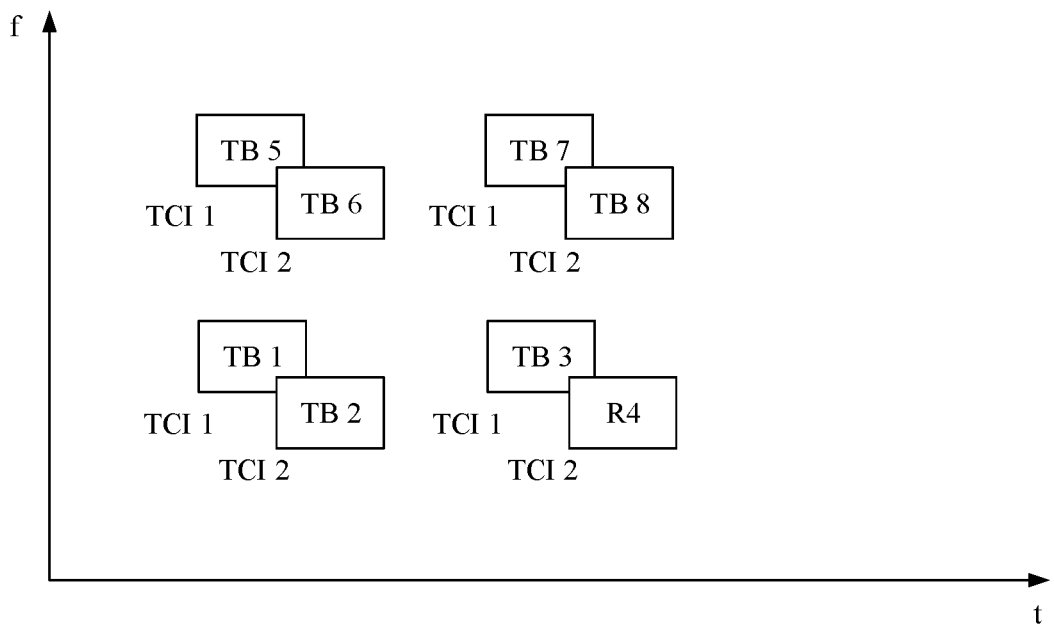
FIG. 19 is a schematic diagram 1 of a mapping relationship between spatial correlation parameters and transport blocks in a case of three multiplexing manners according to an embodiment of this application.
Figure 20:
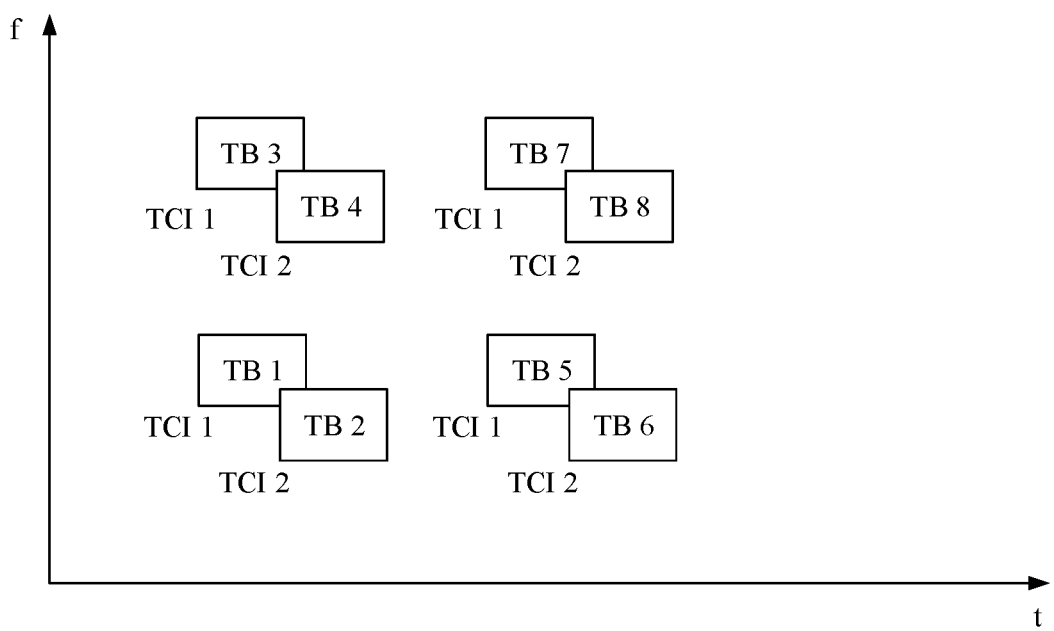
FIG. 20 is a schematic diagram 2 of a mapping relationship between spatial correlation parameters and transport blocks in a case of three multiplexing manners according to an embodiment of this application.

For example, as shown in FIG. 19 and FIG. 20, in FIG. 19, a first multiplexing manner is space division multiplexing, a second multiplexing manner is time division multiplexing, and a third multiplexing manner is frequency division multiplexing, transport blocks in each group of transport blocks are arranged in an order corresponding to the multiplexing manner, namely, space division multiplexing, and M groups of transport blocks are first arranged in an order corresponding to the multiplexing manner, namely, time division multiplexing, and then arranged in an order corresponding to the multiplexing manner, namely, frequency division multiplexing. In FIG. 20, a first multiplexing manner is space division multiplexing, a second multiplexing manner is frequency division multiplexing, and a third multiplexing manner is time division multiplexing, transport blocks in each group of transport blocks are arranged in an order corresponding to the multiplexing manner, namely, space division multiplexing, and M groups of transport blocks are first arranged in an order corresponding to the multiplexing manner, namely, frequency division multiplexing, and then arranged in an order corresponding to the multiplexing manner, namely, time division multiplexing. It is assumed that K=2, N=8, and M=4. That is, two spatial correlation parameters, namely, a TCI 1 and a TCI 2, are mapped to eight same transport blocks, namely, a TB 1 to a TB 8. In this case, a first group of transport blocks includes the TB 1 and the TB 2, a second group of transport blocks includes the TB 3 and the TB 4, a third group of transport blocks includes the TB 5 and the TB 6, and the fourth group of transport blocks includes the TB 7 and the TB 8. In addition, the TB 1 and the TB 2 are space division multiplexed, the TB 3 and the TB 4 are space division multiplexed, the TB 4 and the TB 5 are space division multiplexed, and the TB 6 and the TB 7 are space division multiplexed. In FIG. 19, a first group of transport blocks and a second group of transport blocks are time division multiplexed, a third group of transport blocks and a fourth group of transport blocks are time division multiplexed, and the first and second groups of transport blocks and the third and fourth groups of transport blocks are frequency division multiplexed. In FIG. 20, a first group of transport blocks and a second group of transport blocks are frequency division multiplexed, a third group of transport blocks and a fourth group of transport blocks are frequency division multiplexed, and the first and second groups of transport blocks and the third and fourth groups of transport blocks are time division multiplexed. The TCI 1 may be mapped to the TB 1, the TB 3, the TB 5, and the TB 7, and the TCI 2 may be mapped to the TB 2, the TB 4, the TB 6, and the TB 8.

For example, as shown in FIG. 19 and FIG. 20, in FIG. 19, the first multiplexing manner is space division multiplexing, the second multiplexing manner is time division multiplexing, the third multiplexing manner is frequency division multiplexing, resources in each group of resources are arranged in the order corresponding to the multiplexing manner, namely, space division multiplexing, and M groups of resources are first arranged in the order corresponding to the multiplexing manner, namely, time division multiplexing, and then arranged in the order corresponding to the multiplexing manner, namely, frequency division multiplexing. In FIG. 20, the first multiplexing manner is space division multiplexing, the second multiplexing manner is frequency division multiplexing, and the third multiplexing manner is time division multiplexing, resources in each group of resources are arranged in the order corresponding to the multiplexing manner, namely, space division multiplexing, and M groups of resources are first arranged in the order corresponding to the multiplexing manner, namely, frequency division multiplexing, and then arranged in the order corresponding to the multiplexing manner, namely, time division multiplexing. A transport block is replaced with a resource. It is assumed that K=2, N=8, and M=4. That is, the two spatial correlation parameters, namely, the TCI 1 and the TCI 2, are mapped to eight resources R1 to R8. In this case, a first group of resources includes R1 and R2, a second group of resources includes R3 and R4, a third group of resources includes R5 and R6, and the second group of resources includes R7 and TB8. In addition, R1 and R2 are space division multiplexed, R3 and R4 are space division multiplexed, R4 and R5 are space division multiplexed, and R6 and R7 are space division multiplexed. In FIG. 19, a first group of resources and a second group of resources are time division multiplexed, a third group of resources and a fourth group of resources are time division multiplexed, and the first and second groups of resources and the third and fourth groups of resources are frequency division multiplexed. In FIG. 20, a first group of resources and a second group of resources are frequency division multiplexed, a third group of resources and a fourth group of resources are frequency division multiplexed, and the first and second groups of resources and the third and fourth groups of resources are time division multiplexed. The TCI 1 may be mapped to R1, R3, R5, and R7, and the TCI 2 may be mapped to R2, R4, R6, and R8.

It should be noted that, when two multiplexing manners are used for the N transport blocks, the terminal device may uniquely determine an order of the N transport blocks based on the first multiplexing manner and the second multiplexing manner. When three multiplexing manners are used for the N transport blocks, the terminal device may uniquely determine the order of the N transport blocks based on the first multiplexing manner, the second multiplexing manner, and the third multiplexing manner. That is, the terminal device can determine the order of the N transport blocks by using the foregoing method.

The mapping relationship between the K spatial correlation parameters and the N transport blocks may be configured by the network device, may be predefined in a protocol, or may be determined by the terminal device based on a frequency domain spacing or a time domain spacing between at least two transport blocks. For example, when a frequency domain spacing or a time domain spacing between adjacent transport blocks in the N transport blocks is greater than a first threshold, a manner in which the K spatial correlation parameters arranged in the first order are sequentially mapped to the N transport blocks or a manner in which the $i^{th}$ spatial correlation parameter in the K spatial correlation parameters arranged in the first order is mapped to the $(K*j+i)^{th}$ transport block in the N transport blocks may be used. In this manner, a better diversity gain can be obtained when a frequency domain spacing or a time domain spacing between transport blocks is larger. When the frequency domain spacing or the time domain spacing between the adjacent transport blocks in the N transport blocks is less than the first threshold, a manner in which the K spatial correlation parameters arranged in the first order are sequentially mapped to the K groups of transport blocks arranged in the order corresponding to the multiplexing manner may be used. In this manner, frequent beam switching and excessive channel estimation can be avoided when the frequency domain spacing or the time domain spacing between the transport blocks is smaller, thereby reducing implementation complexity of the terminal device.

In this embodiment of this application, the repetition quantity N of the transport block may be indicated by using one or more parameters.

For example, in a manner, each multiplexing manner may be indicated by using one parameter. For example, there are N1 same transport blocks that are time division multiplexed, N2 same transport blocks that are frequency division multiplexed, and N3 same transport blocks that are space division multiplexed. Alternatively, a repetition quantity of a transport block for which each multiplexing manner is used is defined. For example, a repetition quantity of a transport block whose multiplexing manner is time division multiplexing is N1, a repetition quantity of a transport block whose multiplexing manner is frequency division multiplexing is N2, and a repetition quantity of a transport block whose multiplexing manner is space division multiplexing is N3.

For example, in another manner, a total quantity N of repetition quantities of the transport block may be directly indicated. That is, regardless of a quantity of multiplexing manners, only the total quantity N of repetition quantities of the transport block is indicated.

In this embodiment of this application, the mapping relationship between the K spatial correlation parameters and the N transport blocks may alternatively be determined with reference to mapping orders/a mapping order of redundancy versions (RV) and/or modulation and coding schemes (MCS) of the transport blocks. Alternatively, the mapping orders/the mapping order of the RVs and/or the MCSs of the transport blocks are/is determined based on the mapping relationship between the K spatial correlation parameters and the N transport blocks. For example, transport blocks having same RVs use same spatial correlation parameters (for example, TCI IDs). For another example, transport blocks having same MCSs use same spatial correlation parameters (for example, TCI IDs). For another example, same spatial correlation parameters (for example, TCI IDs) uses same MCSs or RVs.

It should be noted that, when only one multiplexing manner (for example, time division multiplexing) is used for the N transport blocks, the multiplexing manner may not be emphasized. That is, the mapping relationship between the K spatial correlation parameters and the N transport blocks may be directly determined. Actually determining the mapping relationship between the K spatial correlation parameters and the N transport blocks based on the multiplexing manner of the N transport blocks is implicitly included.

It should be noted that an execution sequence of step S501 and step S502 is not limited in this embodiment. For example, S501 may be performed before S502, S502 may be performed before S501, or S501 and S502 may be performed simultaneously.

S503: The terminal device determines the mapping relationship between the K spatial correlation parameters and the N transport blocks.

For details, refer to the description in step S502. Details are not described herein again.

It should be noted that an execution sequence of step S501 and step S503 is not limited in this embodiment. For example, S501 may be performed before S503, or S501 and S503 may be performed simultaneously.

S504: The network device sends the N transport blocks based on the mapping relationship.

For each of the N transport blocks, the network device may send the transport block based on a spatial correlation parameter that has the mapping relationship with the transport block.

S505: The terminal device receives the N transport blocks based on the mapping relationship.

For each of the N transport blocks, the terminal device may receive the transport block based on the spatial correlation parameter that has the mapping relationship with the transport block.

S506: The terminal device sends the N transport blocks based on the mapping relationship.

S507: The network device receives the N transport blocks based on the mapping relationship.

It should be noted that either steps S504 and S505 or S506 and S507 are performed. Steps S504 and S505 are for a PDSCH. In this case, the spatial correlation parameter may be a TCI or QCL. Steps S506 and S507 are for a PUSCH. In this case, the spatial correlation parameter is spatial relation information (spatial relation info).

It should be noted that an execution sequence of step S502 and step S504 is not limited in this embodiment. For example, S502 may be performed before S504, or S502 and S504 may be performed simultaneously. In addition, step S502 and step S504 may alternatively be a same step. For example, the network device sends the N transport blocks based on the mapping relationship between the K spatial correlation parameters and the N transport blocks.

Similarly, an execution order of step S503 and step S505 is not limited in this embodiment. For example, S503 may be performed before S505, or S503 and S505 may be performed simultaneously. In addition, step S503 and step S505 may alternatively be a same step. For example, the terminal device receives the N transport blocks based on the mapping relationship between the K spatial correlation parameters and the N transport blocks.

It should be noted that an execution sequence of step S502 and step S507 is not limited in this embodiment. For example, S502 may be performed before S507, or S502 and S507 may be performed simultaneously. In addition, step S502 and step S507 may alternatively be a same step. For example, the network device receives the N transport blocks based on the mapping relationship between the K spatial correlation parameters and the N transport blocks.

Similarly, an execution order of step S503 and step S506 is not limited in this embodiment. For example, S503 may be performed before S506, or S503 and S506 may be performed simultaneously. In addition, step S503 and step S506 may alternatively be a same step. The terminal device sends the N transport blocks based on the mapping relationship between the K spatial correlation parameters and the N transport blocks.

According to the communication method provided in this embodiment of this application, the network device sends the first indication information to the terminal device. Correspondingly, the terminal device receives the first indication information from the network device. The first indication information is used to indicate the K spatial correlation parameters for receiving the N transport blocks. The network device and the terminal device determine the mapping relationship between the K spatial correlation parameters and the N transport blocks. The network device sends the N transport blocks based on the mapping relationship. Correspondingly, the terminal device receives the N transport blocks based on the mapping relationship. Alternatively, the terminal device sends the N transport blocks based on the mapping relationship. Correspondingly, the network device receives the N transport blocks based on the mapping relationship. When transport blocks are repeatedly sent, the network device and the terminal device determine the mapping relationship between the spatial correlation parameters and the transport blocks, thereby learning, based on the mapping relationship, which transport block is to be sent or received based on which spatial correlation parameter.

It may be understood that, in the foregoing embodiments, methods and/or steps implemented by the terminal device may also be implemented by a component (for example, a chip or a circuit) that can be used in the terminal device, and methods and/or steps implemented by the network device may also be implemented by a component that can be used in the network device.

The foregoing mainly describes the solutions provided in the embodiments of this application from a perspective of interaction between the network elements. Correspondingly, an embodiment of this application further provides a communication apparatus, and the communication apparatus is configured to implement the foregoing method. The communication apparatus may be the terminal device in the foregoing method embodiment, or an apparatus including the foregoing terminal device, or a component that can be used in the terminal device. Alternatively, the communication apparatus may be the network device in the foregoing method embodiment, or an apparatus including the foregoing network device, or a component that can be used in the network device. It can be understood that, to implement the foregoing functions, the communication apparatus includes a corresponding hardware structure and/or software module for performing the functions. A person skilled in the art should be easily aware that units, algorithms, and steps in the examples described with reference to the embodiments disclosed in this specification can be implemented by hardware or a combination of hardware and computer software in this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, the communication apparatus may be divided into functional modules based on the foregoing method embodiment. For example, each functional module may be obtained through division based on each corresponding function, or two or more functions may be integrated into one processing module. The integrated module may be implemented in a form of hardware, or may be implemented in a form of a software functional module. It should be noted that, in the embodiments of this application, division into the modules is an example, and is merely logical function division. During actual implementation, another division manner may be used.

Figure 21:
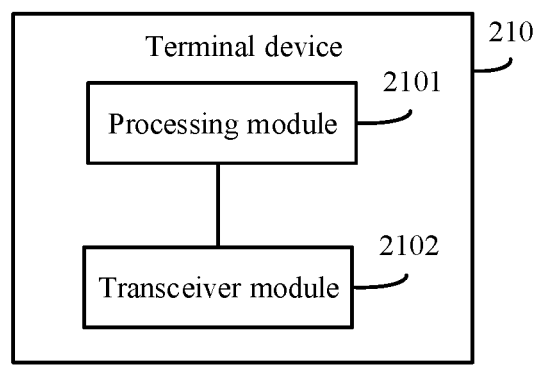
FIG. 21 is a schematic structural diagram 2 of a terminal device according to an embodiment of this application.

For example, the communication apparatus is the terminal device in the foregoing method embodiment. FIG. 21 is a schematic structural diagram of a terminal device 210. The terminal device 210 includes a processing module 2101 and a transceiver module 2102. The transceiver module 2102 may also be referred to as a transceiver unit, and is configured to implement a sending and/or receiving function, for example, may be a transceiver circuit, a transceiver, a transceiver, or a communication interface.

The transceiver module 2102 is configured to receive first indication information, where the first indication information is used to indicate K spatial correlation parameters for receiving N transport blocks, the N transport blocks are same transport blocks, K and N are integers greater than 1, and K≤N; the processing module 2101 is configured to determine a mapping relationship between the K spatial correlation parameters and the N transport blocks; the transceiver module 2102 is further configured to receive the N transport blocks based on the mapping relationship.

Optionally, the processing module 2101 is specifically configured to determine the mapping relationship between the K spatial correlation parameters and the N transport blocks based on a multiplexing manner of the N transport blocks, where the multiplexing manner includes at least one of space division multiplexing, time division multiplexing, and frequency division multiplexing.

Optionally, one multiplexing manner is used for the N transport blocks, and the N transport blocks include K groups of transport blocks; and the mapping relationship between the K spatial correlation parameters and the N transport blocks includes: the K spatial correlation parameters arranged in a first order are sequentially mapped to the K groups of transport blocks arranged in an order corresponding to the multiplexing manner.

Optionally, the mapping relationship between the K spatial correlation parameters and the N transport blocks includes: the K spatial correlation parameters arranged in a first order are sequentially mapped to the N transport blocks.

Optionally, the mapping relationship between the K spatial correlation parameters and the N transport blocks includes: an $i^{th}$ spatial correlation parameter in the K spatial correlation parameters arranged in a first order is mapped to a $(K*j+i)^{th}$ transport block in the N transport blocks, where i and j are integers, $1 \le i \le K$, $1 \le K*j+i \le N$, $0 \le j \le \lceil N/K \rceil - 1$, and $\lceil\ \rceil$ represents rounding up.

Optionally, one multiplexing manner is used for the N transport blocks, and the N transport blocks are arranged in an order corresponding to the multiplexing manner.

Optionally, at least two multiplexing manners are used for the N transport blocks, the at least two multiplexing manners include a first multiplexing manner, the N transport blocks include M groups of transport blocks, M is a positive integer, and transport blocks in each group of transport blocks are arranged in an order corresponding to the first multiplexing manner.

Optionally, two multiplexing manners are used for the N transport blocks, and the M groups of transport blocks are arranged in an order corresponding to a second multiplexing manner.

Optionally, the first multiplexing manner is space division multiplexing, and the second multiplexing manner is time division multiplexing or frequency division multiplexing; the first multiplexing manner is time division multiplexing, and the second multiplexing manner is frequency division multiplexing; or the first multiplexing manner is frequency division multiplexing, and the second multiplexing manner is time division multiplexing.

Optionally, three multiplexing manners are used for the N transport blocks, and the groups of transport blocks are first arranged in an order corresponding to a second multiplexing manner, and then arranged in an order corresponding to a third multiplexing manner.

Optionally, the first multiplexing manner is space division multiplexing, the second multiplexing manner is time division multiplexing, and the third multiplexing manner is frequency division multiplexing; or the first multiplexing manner is space division multiplexing, the second multiplexing manner is frequency division multiplexing, and the third multiplexing manner is time division multiplexing.

Optionally, the first order is an ascending order of identifiers of the spatial correlation parameters, a descending order of the identifiers of the spatial correlation parameters, or an order of the K spatial correlation parameters indicated by the first indication information.

Optionally, an order corresponding to a multiplexing manner, namely, space division multiplexing, is an ascending order of indexes of demodulation reference signal ports, a descending order of the indexes of the demodulation reference signal ports, an ascending order of indexes of demodulation reference signal port groups, a descending order of the indexes of the demodulation reference signal port groups, an ascending order of indexes of demodulation reference signal port groups indicated by an antenna port field, a descending order of the indexes of the demodulation reference signal port groups indicated by the antenna port field, an ascending order of indexes of demodulation reference signal ports indicated by the antenna port field, a descending order of the indexes of the demodulation reference signal ports indicated by the antenna port field, an order of the indexes of the demodulation reference signal port groups indicated by the antenna port field, or an order of the indexes of the demodulation reference signal ports indicated by the antenna port field; and each one or more demodulation reference signal ports or demodulation reference signal port groups are used to demodulate one of the N transport blocks.

An order corresponding to a multiplexing manner, namely, space division multiplexing, is an ascending order of indexes of demodulation reference signal ports, a descending order of the indexes of the demodulation reference signal ports, an ascending order of indexes of demodulation reference signal port groups, a descending order of the indexes of the demodulation reference signal port groups, an ascending order of indexes of demodulation reference signal port groups indicated by an antenna port field, a descending order of the indexes of the demodulation reference signal port groups indicated by the antenna port field, an ascending order of indexes of demodulation reference signal ports indicated by the antenna port field, a descending order of the indexes of the demodulation reference signal ports indicated by the antenna port field, an order of the indexes of the demodulation reference signal port groups indicated by the antenna port field, or an order of the indexes of the demodulation reference signal ports indicated by the antenna port field. Each one or more demodulation reference signal ports or demodulation reference signal port groups correspond to one of the N resources.

Optionally, an order corresponding to a multiplexing manner, namely, time division multiplexing, is an ascending order of indexes of time domain resources or a descending order of the indexes of the time domain resources, and each time domain resource is used to carry one of the N transport blocks.

Optionally, an order corresponding to a multiplexing manner, namely, frequency division multiplexing, is an ascending order of indexes of frequency domain resources or a descending order of the indexes of the frequency domain resources, where each frequency domain resource is used to carry one of the N transport blocks.

Optionally, the spatial correlation parameter is spatial correlation information or transmission configuration indicator TCI information.

Optionally, multiplexing manners, namely, time division multiplexing, and frequency division multiplexing, are used for the N transport blocks, and the N transport blocks include M groups of transport blocks; and the mapping relationship between the K spatial correlation parameters and the N transport blocks includes: an $i^{th}$ spatial correlation parameter in the K spatial correlation parameters arranged in a first order is mapped to a $(K*j+i)^{th}$ group of transport blocks in the M groups of transport blocks, where i and j are integers, $1 \leq i \leq K$, $1 \leq K*j+i \leq M$, $0 \leq j \leq \lceil M/K \rceil - 1$, and $\lceil \ \rceil$ represents rounding up.

All related content of the steps in the foregoing method embodiment may be cited in function descriptions of corresponding functional modules or descriptions on the foregoing method side. Details are not described herein again.

In this embodiment, the terminal device 210 is presented in a form of functional modules obtained through division in an integrated manner. The "module" herein may be a specified ASIC, a circuit, a processor and a memory that execute one or more software or firmware programs, an integrated logic circuit, and/or another component that can provide the foregoing functions. In a simple embodiment, a person skilled in the art may figure out that the terminal device 210 may be in a form of the terminal device 105 shown in FIG. 2.

For example, the processor 180 in the terminal device 105 shown in FIG. 2 may invoke computer-executable instructions stored in the memory 120, to enable the terminal device 105 to perform the communication method in the foregoing method embodiment.

Specifically, the processor 180 in the terminal device 105 shown in FIG. 2 may invoke the computer-executable instructions stored in the memory 120, to implement functions/implementation processes of the processing module 2101 and the transceiver module 2102 in FIG. 21. Alternatively, the processor 180 in the terminal device 105 shown in FIG. 2 may invoke the computer-executable instructions stored in the memory 120, to implement functions/implementation processes of the processing module 2101 in FIG. 21, and the RF circuit 110 in the terminal device 105 shown in FIG. 2 may implement functions/implementation processes of the transceiver module 2102 in FIG. 21.

The terminal device 105 provided in this embodiment can perform the foregoing communication method. Therefore, for a technical effect that can be achieved by the terminal device 105, refer to the foregoing method embodiment. Details are not described herein again.

Figure 22:
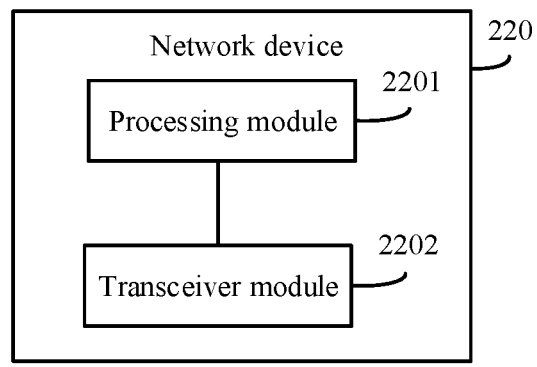
FIG. 22 is a schematic structural diagram 2 of a network device according to an embodiment of this application.

Alternatively, for example, the communication apparatus is the network device in the foregoing method embodiment. FIG. 22 is a schematic structural diagram of a network device 220. The network device 220 includes a processing module 2201 and a transceiver module 2202. The transceiver module 2202 may also be referred to as a transceiver unit, and is configured to implement a sending and/or receiving function, for example, may be a transceiver circuit, a transceiver, a transceiver, or a communication interface.

The transceiver module 2202 is configured to send first indication information, where the first indication information is used to indicate K spatial correlation parameters for receiving N transport blocks, the N transport blocks are same transport blocks, K and N are integers greater than 1, and $K \leq N$; the processing module 2201 is configured to determine a mapping relationship between the K spatial correlation parameters and the N transport blocks; the transceiver module 2202 is further configured to send the N transport blocks based on the mapping relationship.

Optionally, the processing module 2201 is specifically configured to determine the mapping relationship between the K spatial correlation parameters and the N transport blocks based on a multiplexing manner of the N transport blocks, where the multiplexing manner includes at least one of space division multiplexing, time division multiplexing, and frequency division multiplexing.

Optionally, one multiplexing manner is used for the N transport blocks, and the N transport blocks include K groups of transport blocks; and the mapping relationship between the K spatial correlation parameters and the N transport blocks includes: the K spatial correlation parameters arranged in a first order are sequentially mapped to the K groups of transport blocks arranged in an order corresponding to the multiplexing manner.

Optionally, the mapping relationship between the K spatial correlation parameters and the N transport blocks includes: the K spatial correlation parameters arranged in a first order are sequentially mapped to the N transport blocks.

Optionally, the mapping relationship between the K spatial correlation parameters and the N transport blocks includes: an spatial correlation parameter in the K spatial correlation parameters arranged in a first order is mapped to a $(K*j+i)^{th}$ transport block in the N transport blocks, where i and j are integers, $1 \le i \le K$, $1 \le K*j+i \le N$, $0 \le j \le \lceil N/K \rceil - 1$, and $\lceil \ \rceil$ represents rounding up.

Optionally, one multiplexing manner is used for the N transport blocks, and the N transport blocks are arranged in an order corresponding to the multiplexing manner.

Optionally, at least two multiplexing manners are used for the N transport blocks, the at least two multiplexing manners include a first multiplexing manner, the N transport blocks include M groups of transport blocks, M is a positive integer, and transport blocks in each group of transport blocks are arranged in an order corresponding to the first multiplexing manner.

Optionally, two multiplexing manners are used for the N transport blocks, and the M groups of transport blocks are arranged in an order corresponding to a second multiplexing manner.

Optionally, the first multiplexing manner is space division multiplexing, and the second multiplexing manner is time division multiplexing or frequency division multiplexing; the first multiplexing manner is time division multiplexing, and the second multiplexing manner is frequency division multiplexing; or the first multiplexing manner is frequency division multiplexing, and the second multiplexing manner is time division multiplexing.

Optionally, three multiplexing manners are used for the N transport blocks, and the groups of transport blocks are first arranged in an order corresponding to a second multiplexing manner, and then arranged in an order corresponding to a third multiplexing manner.

Optionally, the first multiplexing manner is space division multiplexing, the second multiplexing manner is time division multiplexing, and the third multiplexing manner is frequency division multiplexing; or the first multiplexing manner is space division multiplexing, the second multiplexing manner is frequency division multiplexing, and the third multiplexing manner is time division multiplexing.

Optionally, the first order is an ascending order of identifiers of the spatial correlation parameters, a descending order of the identifiers of the spatial correlation parameters, or an order of the K spatial correlation parameters indicated by the first indication information.

Optionally, an order corresponding to a multiplexing manner, namely, space division multiplexing, is: an ascending order of indexes of demodulation reference signal ports, a descending order of the indexes of the demodulation reference signal ports, an ascending order of indexes of demodulation reference signal port groups, or a descending order of the indexes of the demodulation reference signal port groups, where each one or more demodulation reference signal ports or demodulation reference signal port groups are used to demodulate one of the N transport blocks; or an ascending order of indexes of demodulation reference signal port groups indicated by an antenna port field, a descending order of the indexes of the demodulation reference signal port groups indicated by the antenna port field, an ascending order of indexes of demodulation reference signal ports indicated by the antenna port field, a descending order of the indexes of the demodulation reference signal ports indicated by the antenna port field, an order of the indexes of the demodulation reference signal port groups indicated by the antenna port field, or an order of the indexes of the demodulation reference signal ports indicated by the antenna port field, where each one or more demodulation reference signal ports or demodulation reference signal port groups correspond to one of the N resources.

Optionally, an order corresponding to a multiplexing manner, namely, time division multiplexing, is an ascending order of indexes of time domain resources or a descending order of the indexes of the time domain resources, and each time domain resource is used to carry one of the N transport blocks.

Optionally, an order corresponding to a multiplexing manner, namely, frequency division multiplexing, is an ascending order of indexes of frequency domain resources or a descending order of the indexes of the frequency domain resources, where each frequency domain resource is used to carry one of the N transport blocks.

Optionally, the spatial correlation parameter is spatial correlation information or transmission configuration indicator TCI information.

Optionally, multiplexing manners, namely, time division multiplexing, and frequency division multiplexing, are used for the N transport blocks, and the N transport blocks include M groups of transport blocks; and the mapping relationship between the K spatial correlation parameters and the N transport blocks includes: an $i^{th}$ spatial correlation parameter in the K spatial correlation parameters arranged in a first order is mapped to a $(K*j+i)^{th}$ group of transport blocks in the M groups of transport blocks, where i and j are integers, $1 \le i \le K$, $1 \le K*j+i \le M$, $0 \le j \le \lceil M/K \rceil - 1$, and $\lceil \ \rceil$ represents rounding up.

All related content of the steps in the foregoing method embodiment may be cited in function descriptions of corresponding functional modules or descriptions on the foregoing method side. Details are not described herein again.

In this embodiment, the network device 220 is presented in a form of functional modules obtained through division in an integrated manner. The "module" herein may be a specified ASIC, a circuit, a processor and a memory that execute one or more software or firmware programs, an integrated logic circuit, and/or another component that can provide the foregoing functions. In a simple embodiment, a person skilled in the art may figure out that the network device 220 may be in a form of the network device 300 shown in FIG. 3.

For example, the processor 301 in the network device 300 shown in FIG. 3 may invoke computer-executable instructions stored in the memory 302, to enable the network device 300 to perform the communication method in the foregoing method embodiment.

Specifically, the processor 301 in the network device 300 shown in FIG. 3 may invoke the computer-executable instructions stored in the memory 302, to implement functions/implementation processes of the processing module 2201 and the transceiver module 2202 in FIG. 22. Alternatively, the processor 301 in the network device 300 shown in FIG. 3 may invoke the computer-executable instructions stored in the memory 302, to implement functions/implementation processes of the processing module 2201 in FIG. 22, and the communication interface 303 in the network device 300 shown in FIG. 3 may implement functions/implementation processes of the transceiver module 2202 in FIG. 22.

The network device 220 provided in this embodiment can perform the foregoing communication method. Therefore, for a technical effect that can be achieved by the network device 220, refer to the foregoing method embodiment. Details are not described herein again.

An embodiment of this application further provides a communication apparatus, including a processor and a memory. The memory is configured to store a program, and the processor invokes the program stored in the memory, so that the communication apparatus performs the communication method of the terminal device in FIG. 5.

An embodiment of this application further provides a communication apparatus, including a processor and a memory. The memory is configured to store a program, and the processor invokes the program stored in the memory, so that the communication apparatus performs the communication method of the network device in FIG. 5.

An embodiment of this application further provides a computer-readable storage medium. The computer-readable storage medium stores instructions. When the instructions are run on a computer or a processor, the computer or the processor is enabled to perform the communication method of the terminal device or the network device in FIG. 5.

An embodiment of this application further provides a computer program product including instructions. When the instructions are run on a computer or a processor, the computer or the processor is enabled to perform the communication method of the terminal device or the network device in FIG. 5.

An embodiment of this application provides a chip system. The chip system includes a processor, used by a communication apparatus to perform the communication method of the terminal device in FIG. 5, for example, to receive first indication information, where the first indication information is used to indicate K spatial correlation parameters for receiving N transport blocks, the N transport blocks are same transport blocks, K and N are integers greater than 1, and K≤N; to determine a mapping relationship between the K spatial correlation parameters and the N transport blocks; to receive the N transport blocks based on the mapping relationship.

In a possible design, the chip system further includes a memory. The memory is configured to store a program instruction and data that are necessary for the terminal device. The chip system may include a chip and an integrated circuit, or may include a chip and another discrete device. This is not specifically limited in this embodiment of this application.

An embodiment of this application provides a chip system. The chip system includes a processor, used by a communication apparatus to perform the communication method of the network device in FIG. 5, for example, to send first indication information, where the first indication information is used to indicate K spatial correlation parameters for receiving N transport blocks, the N transport blocks are same transport blocks, K and N are integers greater than 1, and K≤N; to determine a mapping relationship between the K spatial correlation parameters and the N transport blocks; to send the N transport blocks based on the mapping relationship.

In a possible design, the chip system further includes a memory. The memory is configured to store a program instruction and data that are necessary for the network device. The chip system may include a chip and an integrated circuit, or may include a chip and another discrete device. This is not specifically limited in this embodiment of this application.

The communication apparatus, the computer storage medium, the computer program product, or the chip system provided in this application are configured to perform the foregoing communication method. Therefore, for beneficial effects that can be achieved, refer to the beneficial effects in the implementations provided above. Details are not described herein again.

It should be understood that sequence numbers of the foregoing processes do not mean execution sequences in the embodiments of this application. The execution sequences of the processes should be determined according to functions and internal logic of the processes, and should not be construed as any limitation on the implementation processes of the embodiments of this application.

A person of ordinary skill in the art may be aware that units and algorithm steps in the examples described with reference to the embodiments disclosed in this specification can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiment. Details are not described herein again.

In the several embodiments provided in this application, it should be understood that the disclosed system, device, and method may be implemented in other manners. For example, the described device embodiments are merely an example. For example, division into the units is merely logical function division. During actual implementation, another division manner may be used. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the devices or units may be implemented in electrical, mechanical, or another form.

The units described as separate parts may or may not be physically separate, and parts displayed as units may or may not be physical units, that is, may be located in one location, or may be distributed on a plurality of network units. Some or all of the units may be selected based on actual requirements to achieve the objectives of the solutions of the embodiments.

In addition, functional units in the embodiments of this application may be integrated into one processing unit, each of the units may exist alone physically, or two or more units are integrated into one unit.

All or some of the foregoing embodiments may be implemented by using software, hardware, firmware, or any combination thereof. When a software program is used to implement the embodiments, all or some of the embodiments may be implemented in a form of a computer program product. The computer program product includes one or more computer instructions. When the computer program instructions are loaded and executed on a computer, the procedures or functions according to the embodiments of this application are all or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

The foregoing descriptions are merely specific implementations of this application, but the protection scope of this application is not limited thereto. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication method, comprising:
receiving first indication information, wherein the first indication information is used to indicate K spatial correlation parameters for receiving N transport blocks carried on N resources, the N transport blocks are the same transport blocks, K and N are integers greater than 1, and K≤N, wherein the spatial correlation parameters are transmission configuration indicator (TCI) information;
determining a mapping relationship between the K spatial correlation parameters and the N resources; and
receiving the transport block on the N resources based on the mapping relationship,
wherein the determining the mapping relationship between the K spatial correlation parameters and the N resources comprises:
determining the mapping relationship between the K spatial correlation parameters and the N resources based on a multiplexing manner of the N resources, wherein the multiplexing manner comprises at least one of space division multiplexing, time division multiplexing, or frequency division multiplexing;
wherein three multiplexing manners are used for the N resources, and the N resources comprise K groups of resources, and the mapping relationship between the K spatial correlation parameters and the N resources comprises:
the K groups of the N resources are first arranged in a second order corresponding to a second multiplexing manner, and then arranged in a third order corresponding to a third multiplexing manner; and
the K spatial correlation parameters arranged in a first order are sequentially mapped to the K groups of resources arranged in the third order; and
wherein the mapping relationship between the K spatial correlation parameters and the N resources comprises:
the K spatial correlation parameters arranged in the first order are cyclically and sequentially mapped to the N resources.

2. The method according to claim 1, wherein the mapping relationship between the K spatial correlation parameters and the N resources comprises:
an $i^{th}$ spatial correlation parameter in the K spatial correlation parameters arranged in a first order is mapped to a $(K*j+i)^{th}$ resource in the N resources, wherein i and j are integers, $1 \leq i \leq K$, $1 \leq K*j+i \leq N$, $0 \leq j \leq \lceil N/K \rceil - 1$, and $\lceil \ \rceil$ represents rounding up.

3. The method according to claim 1, wherein the three multiplexing manners comprise a first multiplexing manner, the N resources comprise M groups of resources, M is a positive integer, and resources in each group of resources are arranged in an order corresponding to the first multiplexing manner.

4. The method according to claim 1, wherein the first indication information is transferred by using at least one of second indication information, third indication information, and fourth indication information, wherein the second indication information is carried by using radio resource control (RRC) signaling, wherein the third indication information is carried by using media access control-control element (MAC-CE) signaling, and wherein the fourth indication information is carried by using downlink control information (DCI) signaling.

5. A communication method, comprising:
sending first indication information, wherein the first indication information is used to indicate K spatial correlation parameters for receiving N transport blocks carried on N resources, the N transport blocks are the same transport blocks, K and N are integers greater than 1, and K≤N, wherein the spatial correlation parameters are transmission configuration indicator (TCI) information;
determining a mapping relationship between the K spatial correlation parameters and the N resources; and
sending the transport block on the N resources based on the mapping relationship,
wherein the determining the mapping relationship between the K spatial correlation parameters and the N resources comprises:
determining the mapping relationship between the K spatial correlation parameters and the N resources based on a multiplexing manner of the N resources, wherein the multiplexing manner comprises at least one of space division multiplexing, time division multiplexing, or frequency division multiplexing;
wherein three multiplexing manners are used for the N resources, and the N resources comprise K groups of resources, and the mapping relationship between the K spatial correlation parameters and the N resources comprises:
the K groups of the N resources are first arranged in a second order corresponding to a second multiplexing manner, and then arranged in a third order corresponding to a third multiplexing manner; and
the K spatial correlation parameters arranged in a first order are sequentially mapped to the K groups of resources arranged in the third order;
wherein the mapping relationship between the K spatial correlation parameters and the N resources comprises:
the K spatial correlation parameters arranged in the first order are cyclically and sequentially mapped to the N resources.

6. The method according to claim 5, wherein the mapping relationship between the K spatial correlation parameters and the N resources comprises:
an $i^{th}$ spatial correlation parameter in the K spatial correlation parameters arranged in a first order is mapped to a $(K*j+i)^{th}$ resource in the N resources, wherein i and j are integers, $1 \leq i \leq K$, $1 \leq K*j+i \leq N$, $0 \leq j \leq \lceil N/K \rceil - 1$, and $\lceil \ \rceil$ represents rounding up.

7. The method according to claim 5, wherein the three multiplexing manners comprise a first multiplexing manner, the N resources comprise M groups of resources, M is a positive integer, and resources in each group of resources are arranged in an order corresponding to the first multiplexing manner.

8. The method according to claim 5, wherein the first indication information is transferred by using at least one of second indication information, third indication information, and fourth indication information, wherein the second indication information is carried by using radio resource control (RRC) signaling, wherein the third indication information is carried by using media access control-control element (MAC-CE) signaling, and wherein the fourth indication information is carried by using downlink control information (DCI) signaling.

9. A terminal device, comprising a processor and a transceiver, wherein:
   the transceiver is configured to receive first indication information, wherein the first indication information is used to indicate K spatial correlation parameters for receiving N transport blocks carried on N resources, the N transport blocks are the same transport blocks, K and N are integers greater than 1, and K≤N, wherein the spatial correlation parameters are transmission configuration indicator (TCI) information;
   the processor is configured to determine a mapping relationship between the K spatial correlation parameters and the N resources, wherein determining the mapping relationship between the K spatial correlation parameters and the N resources is based on a multiplexing manner of the N resources, wherein the multiplexing manner comprises at least one of space division multiplexing, time division multiplexing, or frequency division multiplexing; and
   the transceiver is further configured to receive the transport block on the N resources based on the mapping relationship;
   wherein three multiplexing manners are used for the N resources, and the N resources comprise K groups of resources, and the mapping relationship between the K spatial correlation parameters and the N resources comprises:
   the K groups of the N resources are first arranged in a second order corresponding to a second multiplexing manner, and then arranged in a third order corresponding to a third multiplexing manner; and
   the K spatial correlation parameters arranged in a first order are sequentially mapped to the K groups of resources arranged in an order corresponding to the multiplexing manner; and
   wherein the mapping relationship between the K spatial correlation parameters and the N resources comprises:
   the K spatial correlation parameters arranged in the first order are cyclically and sequentially mapped to the N resources.

10. The terminal device according to claim 9, wherein the mapping relationship between the K spatial correlation parameters and the N resources comprises:
   an $i^{th}$ spatial correlation parameter in the K spatial correlation parameters arranged in a first order is mapped to a $(K*j+i)^{th}$ resource in the N resources, wherein i and j are integers, $1 \leq i \leq K$, $1 \leq K*j+i \leq N$, $0 \leq j \leq \lceil N/K \rceil - 1$, and $\lceil \ \rceil$ represents rounding up.

11. The terminal device according to claim 9, wherein the first indication information is transferred by using at least one of second indication information, third indication information, and fourth indication information, wherein the second indication information is carried by using radio resource control (RRC) signaling, wherein the third indication information is carried by using media access control-control element (MAC-CE) signaling, and wherein the fourth indication information is carried by using downlink control information (DCI) signaling.

* * * * *